(12) United States Patent
Costa

(10) Patent No.: US 9,041,375 B2
(45) Date of Patent: May 26, 2015

(54) HIGH RESOLUTION CONTROL FOR A MULTIMODE SMPS CONVERTER AND HIGH RESOLUTION SLOPE GENERATOR

(71) Applicant: Infineon Technologies AG, Neubiberg (DE)

(72) Inventor: Pedro Costa, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 225 days.

(21) Appl. No.: 13/663,559

(22) Filed: Oct. 30, 2012

(65) Prior Publication Data

US 2014/0117959 A1     May 1, 2014

(51) Int. Cl.
    *G05F 1/00*            (2006.01)
    *H02M 3/157*         (2006.01)

(52) U.S. Cl.
    CPC ..................... *H02M 3/157* (2013.01)

(58) Field of Classification Search
    CPC ..................................................... H02M 3/156
    USPC .......... 323/282, 283, 284, 285, 351; 700/297, 700/298, 293, 295, 282
    See application file for complete search history.

(56) References Cited

U.S. PATENT DOCUMENTS

| | | | |
|---|---|---|---|
| 3,836,908 A | 9/1974 | Hegendorfer | |
| 5,774,084 A | 6/1998 | Brombaugh et al. | |
| 7,197,683 B2 | 3/2007 | Schallmoser | |
| 2004/0187045 A1 | 9/2004 | Butcher | |
| 2010/0242920 A1* | 9/2010 | Omori et al. | 123/490 |
| 2011/0187339 A1* | 8/2011 | Trattler et al. | 323/283 |
| 2012/0105038 A1* | 5/2012 | Chen et al. | 323/283 |

FOREIGN PATENT DOCUMENTS

| | | |
|---|---|---|
| DE | 2317851 A | 10/1974 |
| DE | 102004011723 A1 | 9/2005 |

OTHER PUBLICATIONS

Texas Instruments Incorporated "TL494—Pulse-Width-Modulation Control Circuits"; Sl VS074E—Jan. 1983 revised Feb. 2005; pp. 1-20.
Robert Mammano "Switching Power Supply Topology Voltage Mode vs. Current Mode", Unitrode Corporation, Design Note, Oct. 1994, pp. 1-4.

(Continued)

*Primary Examiner* — Gary L Laxton
*Assistant Examiner* — Trinh Dang

(57) ABSTRACT

In various embodiments a controller for controlling the operation of a switched mode power supply is provided, the controller comprising: a first signal source configured to provide a first set of signals including a set signal and a clear signal, wherein the first set of signals may correspond to a first mode of operation of the switched mode power supply; a second signal source configured to provide a second set of signals including a set signal and a clear signal, wherein the second set of signals may correspond to a second mode of operation of the switched mode power supply; a selecting circuit coupled to the first signal source and to the second signal source, the selecting circuit being configured to select either the first set of signals or the second set of signals; a switching signal generating circuit coupled to the selecting circuit and configured to provide a switching signal to the switched mode power supply based on the set of signals received from the selecting circuit.

30 Claims, 11 Drawing Sheets

(56) References Cited

OTHER PUBLICATIONS

Texas Instruments Incorporated "TPS43000—Multi-Topology High-Frequency PWM Controller", SLUS489, Oct. 2001, pp. 1-26.
Texas Instruments Incorporated "TPS5103—Multiple Mode Synchronous DC/DC Controller", SLVS240A, Sep. 1999—Revised May 2001, pp. 1-40.
Texas Instruments Incorporated "UCC29421, UCC24922, UCC39421, UCC39422 Multimode High-Frequency PWM Controller", SLUS246C, Oct. 1999—Revised Feb. 2005, pp. 1-37.
Lloyd Dixon "U-140 Application Note—Average Current Mode Control of Switching Power Supplies", Unitrode Corporation, pp. 356-369.
Yuri Panov et al. Adaptive Off-Time Control for Variable-Frequency, Soft-Switched Flyback Converter at Light Loads, IEEE Transactions, vol. 17, No. 4. Jul. 2002, pp. 596-603.
Richard Poley et al. Digital Peak Current Mode Control with Slope Compensation using the TMS320F2803x, SPRABE7, Texas Instruments Incorporated, Jun. 2010, pp. 1-28.
Chuan Ni et al. "Application Report—Adaptive Constant On-Time (D-CAPTM) Control Study in Notebook Applications, PMP—Systems Power, SLVA281B", Texas Instrumens Incorporated, Jul. 2007—Revised Dec. 2007, pp. 1-9.
T. Grote et al. "Adaptive Digital Slope Compensatio for Peak Current Mode Control", University of Paderborn, Power Electronics and Electric Drives, pp. 1-7.
K.D. Purton et al. "Average Current Mode Control in Power Electronic Converters—Analog Versus Digital", Department of Electrical and Computer System Engineering, Monash University, Australia, and Switch Mode Power Conversion P/L, Melbourne, Australia, pp. 1-5.
George Hariman et al. Control Method Solves Low Duty-Cycle Dilemmas, Power Electronics Technology, Sep. 2006, pp. 22-30.
Fairchild Semiconductor Corporation "KA7500C SMPS Controller, Apr. 2009", pp. 1-8.
Chen et al. "Multi-mode controller IC for soft-switched flyback converter with high efficiency over the entire load range", Journal of Zhejiang University SCIENCE A, Feb. 26, 2008, revised Jun. 17, 2008, pp. 1411-1419.
Zhang et al. "Multimode Digital Controller for Synchronous Buck Converters Operating Over Wide Ranges of Input Voltages and Load Currents", IEEE Transactions on Power Electronics, vol. 25, No. 8, Aug. 2010, pp. 1958-1965.
Office Action received for German Patent Application No. 102013111844.5, dated Sep. 30, 2014 (for information purposes only), 6 pages.

* cited by examiner

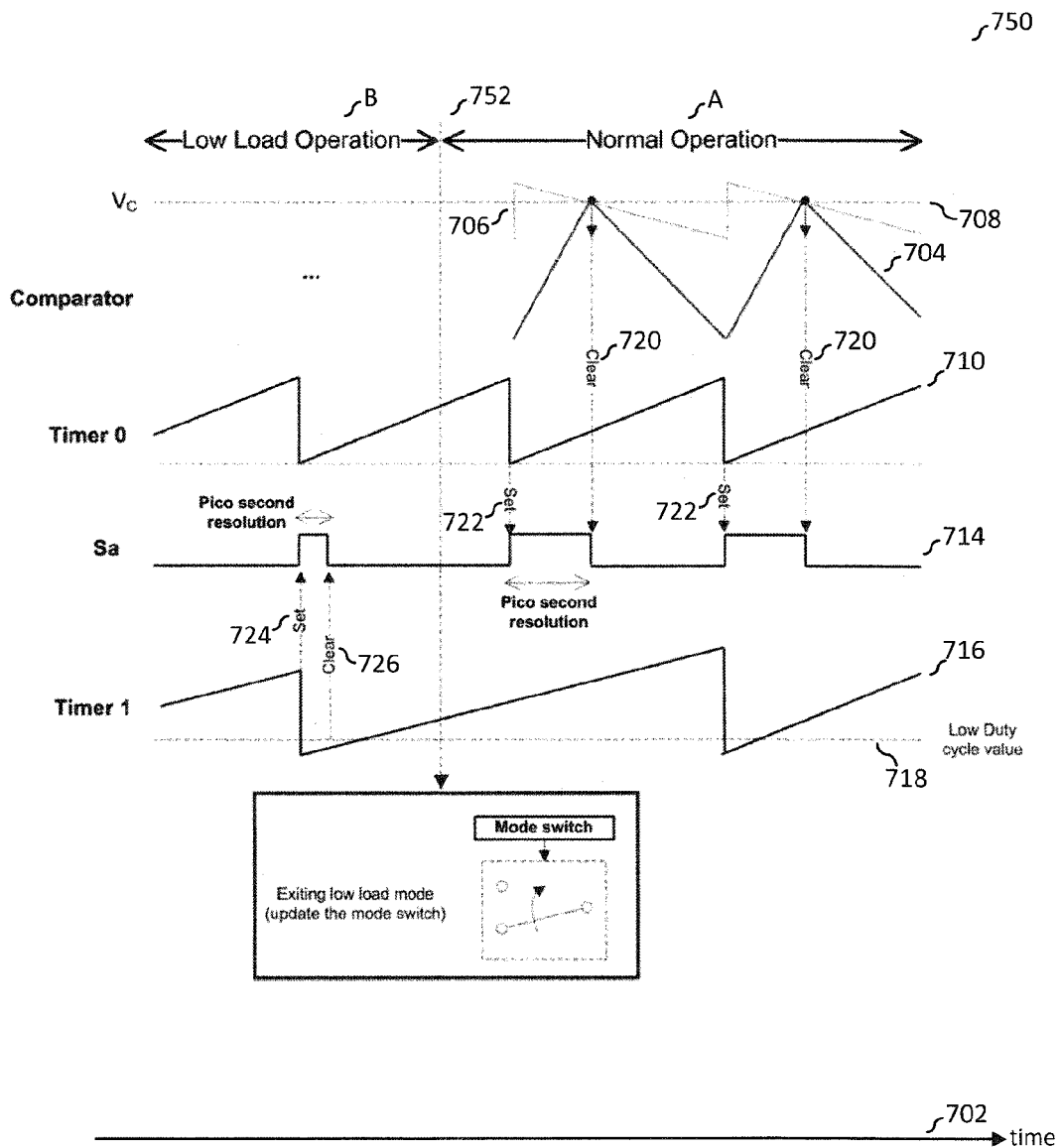

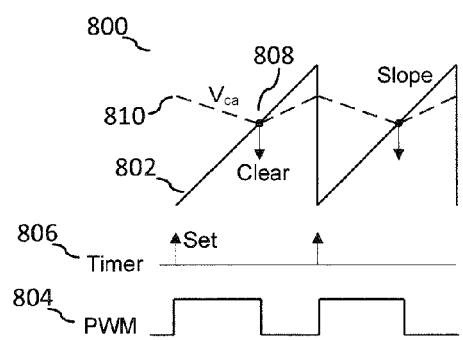
FIG.8A
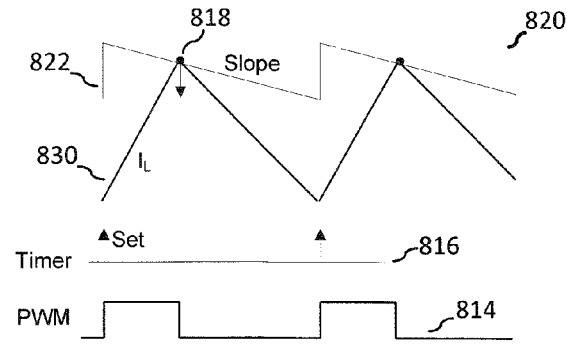
FIG.8B
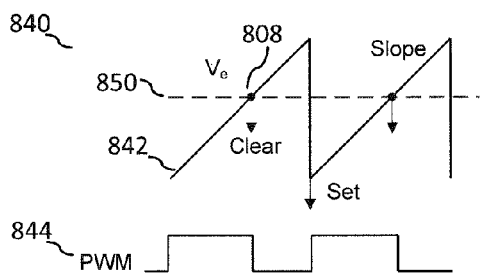
FIG.8C
FIG.9
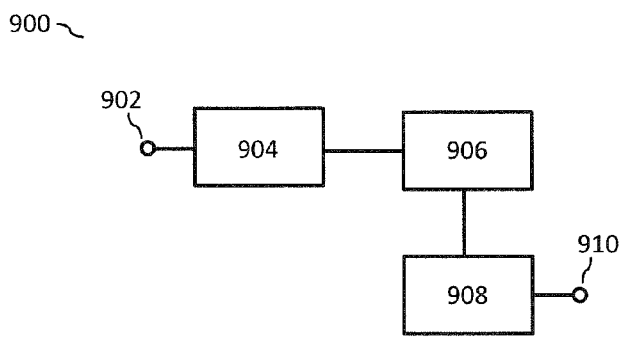

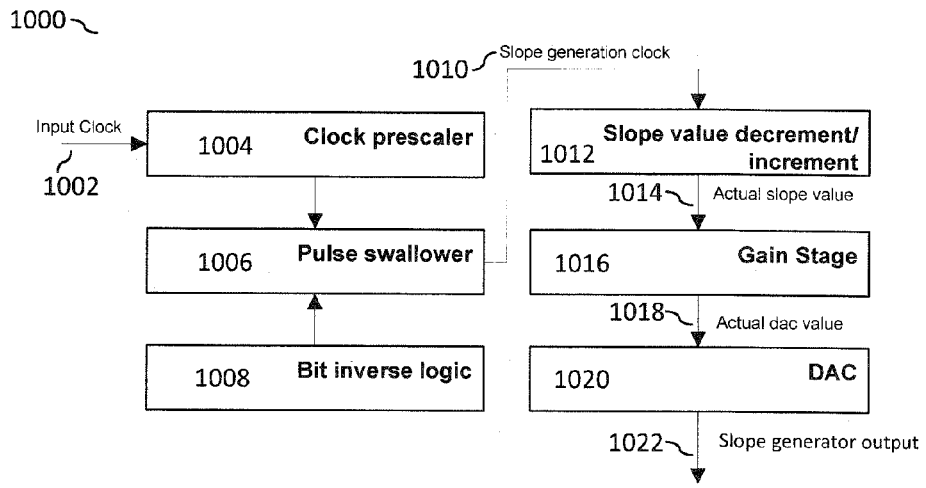
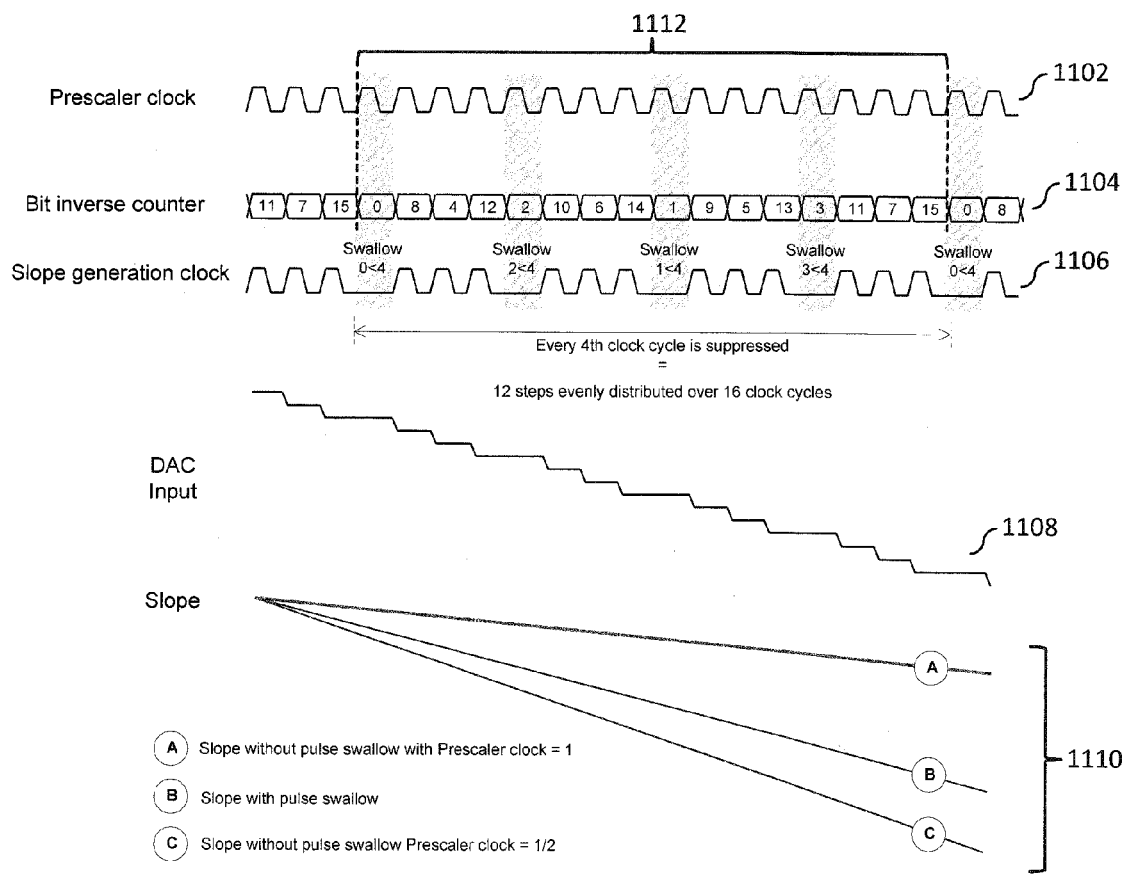

A — Slope generation with a 30 MHz clock with a decrement of 2

B — Slope generation with a 15 MHz clock or a decrement of 1

C — Slope generation with a 30 MHz clock and suppressing 2 clock cycles every 16 clock cycle window

HIGH RESOLUTION CONTROL FOR A MULTIMODE SMPS CONVERTER AND HIGH RESOLUTION SLOPE GENERATOR

TECHNICAL FIELD

Various embodiments generally relate to a high resolution control for a multimode SMPS converter and to a high resolution slope generator.

BACKGROUND

Ordinary SMPS (switched mode power supply) converters may be able to operate in several operating modes. The switching between the individual modes of operation is usually determined by the operating conditions such as output load and/or input voltage. For example, a SMPS converter may operate in CRM (critical conduction mode), i.e. at the boundary between CCM (continuous conduction mode) and DCM (discontinuous conduction mode) during certain operation periods and in other operation periods it may operate in DCM. In the CCM the current flowing through the inductor of a SMPS converter never goes down to zero, in the DCM the current through the inductor of the SMPS converter reaches zero and may remain in that state for a certain period of time. The DCM is characterized by its operating stability and its low requirement with respect to computing power, since there is enough time for the control loop circuit monitoring and controlling the operation of the SMPS converter to calculate needed parameters for the next switching cycles. The modulation technique on which a given operation mode is based may also be updated due to a direct imposition of the operation mode update, for example, from a peak current control modulation to a time fixed control modulation. Changing between different operating modes and/or between different modulation techniques may impose a different usage of resources. For example, while in the peak current control mode one comparator, a slope generator and a timer may be needed, these resources may not be suitable for generating the PWM (pulse width modulation) signal in time fixed modulation.

In general an SMPS converter, independent of its actual operation mode, can also have a very high switching frequency in the range of a few hundreds of kilohertz up to a megahertz which results in the need for a high resolution PWM (pulse width modulation) 1 signal. The resolution of the PWM signal is calculated with the objective of achieving the minimum error within the control loop. This will usually impose, for example, that the PWM signal should have an accuracy/resolution of roughly 1 ns if a 10 bit resolution is needed for a converter operating at 1 MHz.

The demand for an SMPS converter with the ability to operate in various different operation modes is ordinarily solved by using a dedicated multimode SMPS converter controller IC. From the point of view of the microcontroller, this problem can be solved with a complete software control. This type of control would need to reconfigure the complete control loop, i.e. the hardware providing control loop functionality, or to use a double amount of hardware resources in order to provide two separate control loops, each corresponding to a different operation mode. Despite the possible use of such a controller, a high resolution PWM signal generation for low load operating conditions is usually not provided as it is exclusive to the generation of PWM signals for high load operating conditions as the hardware used for the high resolution path tends to be rather costly.

In ordinary feedback control loops for SMPS (switched mode power supplies), for example in SMPS applications providing DC-DC conversion, a slope generation (ramp generation) is needed in several DC-DC topologies in order to control the switching frequency or the duty cycle of the PWM (pulse width modulation) signal which controls the state of the power switches in the SMPS. When using ICs (integrated circuits) that do not have built-in standard slope generators (ramp generators) that include an oscillator and further analog components especially developed for this purpose, an external implementation of such a component is needed or the slope generating function needs to be emulated via software.

Using an external slope generator may be costly and further increase the overall size of the application. The other possibility of emulating a slope generator via a software algorithm, where the resulting signal fed to a DAC (digital-to-analog converter) may be problematic with respect to the required computing power. For example, at 1 MHz an ordinary microcontroller may be able to generate approximately 50 codes, each representing a discrete value of the ramp signal (slope signal). Therefore, the achievable resolution of a ramp signal thus produced may be too low for a lot of applications. In addition, usually a wide range of operation with respect to frequencies and resolutions of the generated ramp signal may need to be covered to meet customers' demands. This, however, may be difficult to implement via software. The alternative is to use a PLL (phase-locked loop) in the controller in order to generate all the possible clock frequencies for a certain application. This approach, however, is rather impractical due to the relatively high cost of a PLL.

SUMMARY

In various embodiments a controller for controlling the operation of a switched mode power supply is provided, the controller comprising: a first signal source configured to provide a first set of signals including a set signal and a clear signal, wherein the first set of signals may correspond to a first mode of operation of the switched mode power supply; a second signal source configured to provide a second set of signals including a set signal and a clear signal, wherein the second set of signals may correspond to a second mode of operation of the switched mode power supply; a selecting circuit coupled to the first signal source and to the second signal source, the selecting circuit being configured to select either the first set of signals or the second set of signals; a switching signal generating circuit coupled to the selecting circuit and configured to provide a switching signal to the switched mode power supply based on the set of signals received from the selecting circuit.

In various further embodiments a circuit is provided which may include an input terminal configured to receive a clock signal, wherein the clock signal may include a sequence of pulses; a bit inverting circuit configured to invert a digital word, each digital word corresponding to a number describing a position of each pulse within the sequence of pulses; a pulse swallowing circuit configured to receive the clock signal and swallow at least one pulse from the sequence of pulses in the clock signal when a pulse swallowing condition for that pulse is satisfied and to thereby generate a modified clock signal; and a digital ramp generation circuit configured to provide a digital ramp signal based on the modified clock signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 7A and 7B show diagrams presenting several signal sequences at various components within the exemplary SMPS converter according to various embodiments, FIGS. 8A to 8C show diagrams representing control schemes in SMPS applications;

FIG. 9 shows a schematic of the circuit according to various embodiments for providing a high resolution slope;

FIG. 10 shows a further schematic of the circuit according to various embodiments for providing a high resolution slope;

FIG. 11 shows various signal sequences generated in and/or used by the circuit according to various embodiments;

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The subject-matter described in this application may solve the problem of switching between different operating modes of an SMPS converters and at the same time being able to maintain a high resolution control signal output (with picosecond resolution) with barely any software interaction, the high resolution control signal controlling the at least one power switch of a SMPS converter.

Figure 1:
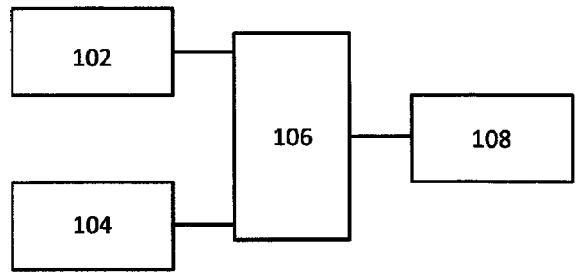
FIG. 1 shows a controller circuit for controlling the generation of the PWM signal for a switched mode power supply according to various embodiments.

In FIG. 1 a controller 100 (or a controlling circuit) for controlling the generation of the PWM signal for a switched mode power supply is shown. In general, the controller 100 may be provided in any kind of SMPS converter of a non-isolated type, for example a buck converter, a boost converter or a buck-boost converter, or of an isolated type, for example a flyback converter, a (resonant) forward converter or a push pull converter, to name a few non-limiting examples of both types.

The controller 100 may include a first signal source 102 configured to provide a first set of signals comprising a set signal and a clear signal, wherein the first set of signals may correspond to a first mode of operation of the switched mode power supply. The controller 100 may further include a second signal source 104 configured to provide a second set of signals comprising a set signal and a clear signal, wherein the second set of signals may correspond to a second mode of operation of the switched mode power supply. The converter 100 may further include a selecting circuit 106 which may be coupled to the first signal source 102, for example to its at least one output, and to the second signal source 104, for example to its at least one output. The selecting circuit 106 may be configured to select either the first set of signals from the first signal source 102 or the second set of signals the second signal source 104 and provide the selected set of signals at its at least one output. In accordance with various embodiments, the selecting circuit 106 may be configured as a multipath multiplexer, multiplexing at least between two sets of signals, for example the first set of signals and the second set of signals, wherein each set of signals includes at least two signals, for example a set signal and a clear signal. The selecting circuit 106 may be coupled to a switching signal generating circuit 108 which may be configured to provide, for example at its at least one output (not shown in FIG. 1), a switching signal to the switched mode power supply based on the set of signals received from the selecting circuit 106. The generated switching signal may for example be a PWM signal specifying when the at least one power switch included in the SMPS converter is to be switched on and switched off. According to various embodiments, the term PWM signal may in fact refer to one, a pair of or more PWM signals, wherein the individual PWM signals may be transformed into one another by simple transformations such as a shift in time or an inversion. For example, when the SMPS converter includes two power switches, the PWM signal generated by the signal generating circuit 108 may be applied to one of the power switches whereas an inverted version of that PWM signal may be applied to the other power switch.

In a further alternative embodiment, the circuit 100 may include at least one further signal source coupled to the selecting circuit 106, such that the selecting circuit 106 may be configured to select one set of signals from at least 3 sets of signals and provide the selected set of signals at its output. In general, the number of signal sources present in a circuit 100 according to various embodiments may be chosen in accordance with the number of desired operation modes of the SMPS converter.

Figure 2:
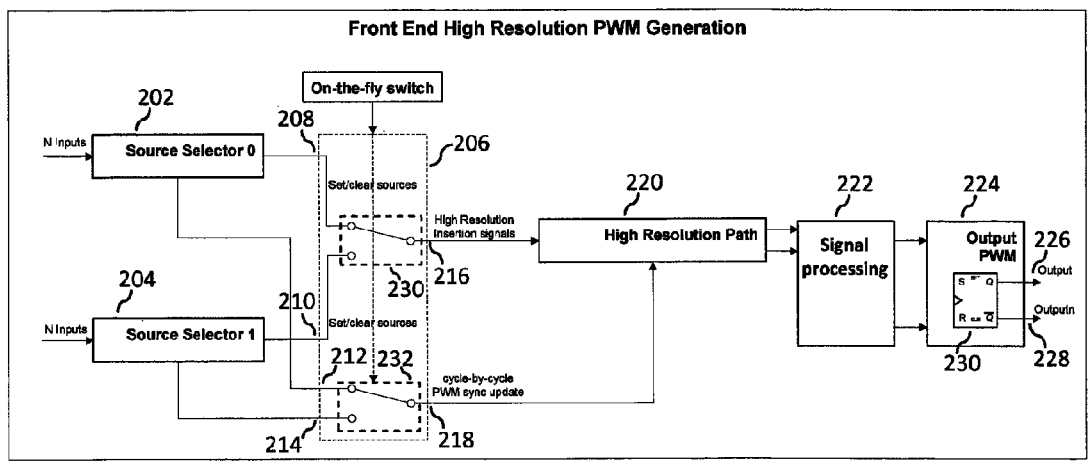
FIG. 2 shows a further implementation of the controller circuit for controlling the generation of the PWM signal for a switched mode power supply according to various embodiments.

A more detailed view of the controller for controlling the generation of the PWM signal for a switched mode power supply is shown in FIG. 2. In the embodiment of the circuit 200 shown in FIG. 2, two signal sources are included. However, as mentioned before, more than two signal sources may be included in the circuit 200 according to various embodiments.

The controller 200 according to various embodiments may include the first signal source 202 and the second signal source 204. Each signal source may receive N input signals on the basis of which each signal source may be configured to generate a set of signals, wherein each set of signals may include N set signals and N clear signals. The number N may be linked to the amount of resources, such as timers, comparators, for example, provided in the microcontroller of the corresponding SMPS converter and configured to receive signals from a corresponding signal source. The number of signal sources may correspond to the desired number of operation modes. That is, each signal source may provide a set of signals on the basis of which switching signals for the SMPS converter operating in a certain operation mode may be generated in the end. A possible operation mode may be, for example, a high load operation mode, a normal load operation mode or a low load operation mode. Each set of signals provided by each signal source may further include an update signal. The update signal may indicate when a corresponding switching signal, for example a PWM signal, for the SMPS converter may be updated. That is, the update signal may indicate the beginning of a new switching cycle of an SMPS converter. An output of the first signal source 202 may be coupled to a first input 208 of the selecting circuit 206 such that the set signal and the clear signal generated from the first set of signals may be provided to the selecting circuit 206. A further output of the first source 202 may be coupled to a third input 212 of the selecting circuit 206 such that the update signal associated with the first set of signals may be provided to the selecting circuit 206. Therefore, in this exemplary example, three signals generated from a respective set of signals are provided to the selecting circuit 206. The second signal source 204 may be coupled to the selecting circuit 206 in the same manner. That is, an output of the second signal source 204 may be coupled to a second input 210 of the selecting switch 206 such that the set signal and the clear signal from the second set of signals may be provided to the selecting circuit 206. A further output of the second signal source 204 may be coupled to a fourth input 214 of the selecting circuit 206 such that the update signal associated with the second set of signals may be provided to the selecting circuit 206. Abstracting towards a higher number of source selectors: if N selecting circuits are provided, then N set signals, N clear signals and N update signals may be provided to the selecting circuit 206. However, every source selector may be configured to generate more than the three mentioned signals (set signal, clear signal, update signal) which are provided to the selecting circuit 206. For example, further signals may be generated by each selecting circuit which may be needed for an implementation of additional functionalities, such as stopping the PWM generation, forcing the output of the controller 200 according to various embodiments a defined state, shutdown.

The selecting circuit 206 may include a first selecting member 230 and a second selecting member 232. The first selecting member 230 may include an output corresponding to a first output 216 of the selecting circuit 206, a first input corresponding to the first input 208 of the selecting circuit 206 and a second input corresponding to the second input 210 of the selecting circuit 206. In analogy, the second selecting member 232 may include a first output corresponding to a second output 216 of the selecting circuit 206, a first input corresponding to the third input 212 of the selecting circuit 206 and a second input corresponding to the fourth input 214 of the selecting circuit 206. The first output 216 of the selecting circuit 206 may be coupled to one input of a high resolution signal forwarding circuit 220 included in the circuit 200 according to various embodiments, the second output 218 of the selecting circuit 206 may be coupled to another input of the high resolution signal forwarding circuit 220. The circuit 200 according to various embodiments may further include a signal processing circuit 222 coupled to outputs of the high resolution signal forwarding circuit 220. Outputs of the signal processing circuit 222 may be coupled to the switching signal generating circuit 224 included in the circuit 200 according to various embodiments. The switching signal generating circuit 224 may include a latch 230, for example in the form of an RS flip-flop. The latch 230 may have a first output corresponding to a first output 226 of the switching signal generating circuit 224 and a second output corresponding to the second output 228 of the switching signal generating circuit 224.

The first selecting member 230 may be configured to select either the set signal and the clear signal from the first set of signals provided at the first input 208 of the selecting circuit 206 or the set signal and the clear signal from the second set of signals or provided at the second input 210 of the selecting circuit 206 and provide the selected set signal and the selected clear signal at the first output 216 of the selecting circuit 206. The second selecting member 232 may be configured to select either the update signal from the first set of signals provided at the third input 212 of the selecting circuit 206 or the update signal from the second set of signals or provided at the fourth input 214 of the selecting circuit 206 and provide the selected update signal at the second output 218 of the selecting circuit 206. The state of the first selecting member 230 and the state of the second selecting member 232 may be for example dictated by the state of the SMPS converter, i.e. by the current operating mode of the SMPS converter. The state of the first selecting member 230 and the state of the second selecting member 232 may be linked. That is, the selecting circuit 206 may be configured such that both selecting members select signals from the same signal source. In other words, the selecting members may either select the set signal, the clear signal and the corresponding update signal either from the first signal source 202 or from the second signal source 204 (or from the at least one further signal source which may be provided in the circuit 200 according to various embodiments). Therefore, in the embodiment of the circuit 200 shown in FIG. 2, the selecting circuit 206 may configured to assume one of two configurations. In a first configuration, the first selecting member 230 may be configured to receive the signal(s) provided at the first input 208 of the selecting circuit 206 and to output those at the first output 216 of the selecting circuit 206 and the second selecting member 232 may be configured to receive the update signal provided at the third input 212 of the circuit 206 and to output it at the second output 218 of the selecting circuit 206. In a second configuration the first selecting member 230 may be configured to receive the signal(s) provided at the second input 210 of the selecting circuit 206 and to output those at the first output 216 of the selecting circuit 206 and the second selecting member 232 may be configured to receive the update signal provided at the fourth input 212 of the circuit 206 and to output it at the second output 218 of the selecting circuit 206. The selecting circuit 206 may be switched between the first configuration and the second configuration (or in between at least three different configurations) depending on the operation mode the SMPS converter is to be in or it is to enter into.

The selected set signal and the selected clear signal provided at the first output 216 of the selecting circuit 206 may be transformed into high resolution signals by the high resolution forwarding circuit 220. That is, the high resolution forwarding circuit 220 may be configured to transform the selected set signal and the selected clear signal provided by the selecting circuit 206 into corresponding high resolution signals, for example by sampling the selected set signal and the selected clear signal at a high sampling frequency. The high resolution signal forwarding circuit 220 may be further configured to adjust the high resolution set signal and the high resolution clear signal based on the update signal received from the selecting circuit 206. The adjustment may be performed on the fly and may take place in situations when the selecting switch 206 transitions from one configuration to another configuration, i.e. when one set of signals is deselected and another set of signals is selected for further processing by the high resolution signal forwarding circuit 220. The high resolution signal forwarding circuit 220 may be further configured to synchronise the update signals from two different sets of signals such that a glitch free transition between one switching signal (e.g. a PWM signal based on one set of signals, e.g. the set of signals from the first signal source) and another switching signal (e.g. a PWM signal based on another set of signals, e.g. the set of signals from the second signal source) may be achieved. The functionality of the high resolution signal forwarding circuit 220 will be explained later in more detail.

The high resolution signal forwarding circuit 220 may be configured to output high resolution signals to the signal processing circuit 222 which may be configured as a dead time generator in order to introduce dead times into the switching signal, i.e. to delay in time the switching on and/or the switching off of one of its outputs with respect to the other one. The dead time adjusted high resolution set/clear signals output by the signal processing circuit 222 may be then applied to the switching signal generating circuit 224 which may be configured to generate a switching signal for the at least one power switch provided in the SMPS converter. However, the signal processing circuit 222 may be configured to implement additional functions, for example clamping the output and/or imposing a certain value on the output of the controller 200. As mentioned earlier, the switching signal may be a PWM signal with a duty cycle adjusted such that the SMPS converter is able to provide the desired output voltage to a load coupled thereto. The switching signal generating circuit 224 may include the latch 230 which may be configured to output switching signals at the first output 226 and the second output 228 of the switching signal generating circuit 224.

The circuit according to various embodiments may be configured to provide multiple path control for the generation of a switching signal, for example a PWM signal, for an SMPS converter. One of at least two signal sources may be chosen and corresponding switching signals may be generated. Here, a switching signal may refer to a set including a set signal and a clear signal which may be provided to the high resolution signal forwarding circuit 220. The update signal to be used which is linked with the corresponding signal source may be reassigned on the fly within the high resolution signal forwarding circuit 220. Thereby, a synchronisation of the update of the set/clear signal to be currently used by the high resolution signal forwarding circuit 220 for processing, which may take place cycle by cycle, may be maintained. With this multiple control scheme it may be possible to have preprogramed working conditions for each one of the signal sources and switch between them, depending on the desired operating mode of the SMPS converter. At the same time, the number of (hardware) resources needed to generate the final switching signal for different SMPS converter operating modes may be drastically reduced, since only one high resolution path in the form of the high resolution signal forwarding circuit 220 needs to be provided.

Each time the selecting circuit 206 transitions from one configuration into another, i.e. each time a transition between operating modes of the SMPS converter takes place, the corresponding signal source providing the set signal and the clear signal (and the update signal) may be activated/deactivated. During the switching between two sets of signals used for the generation of the switching signal the synchronicity of the update of the switching signal from the deselected update signal to the newly selected update signal is not lost. The update signal to be used by the high resolution signal forwarding circuit 220 may be switched in parallel with the switching of the signal source for the set/clear signals.

The selection process with regard to which signal(s) is being used to generate the PWM signal(s) at the first output 226 and the second output 228 may be performed by enabling and disabling the respective sources originally generating the signals which in FIG. 2 are the N input signals of the first signal source 202 and the N input signals of the second signal source 204. However, this procedure may be a complex operation that may involve several hardware and software operations, adding unwanted complexity to the process of switching between different operation modes. Therefore, this problem may be solved by performing the selection at a separate stage independently of the respective sources, for example by means of the selecting circuit 206. The synchronicity between the switching signals of the present operation mode and the next operation mode may be upheld by means of the high resolution signal forwarding circuit 220.

The circuit according to various embodiments may further have the merit that software interaction within the circuit according to various embodiments may be reduced as a full reconfiguration process thereof may not be needed. The synchronicity between the cycle by cycle update of the high resolution set/clear signals in the high resolution signal forwarding circuit 220 may be linked with the signal source currently selected by the selection circuit 206 and providing the set of signals for the generation of the switching signals. Several signal sources may be used for controlling the SMPS converter in several different operating modes, for example even with high resolution in a low load operating mode. The switching between the individual sets of signals from the corresponding signal sources may be done dynamically in order to maintain the synchronicity of the cycle by cycle update of the switching signal, for example the PWM signal output by the switching signal generating circuit 224. In accordance with various embodiments, the term cycle by cycle may describe a process that takes place in every cycle, i.e. in every switching cycle of the SMPS converter which may be defines by one two consecutive set signals within the switching signal.

Figure 3A:
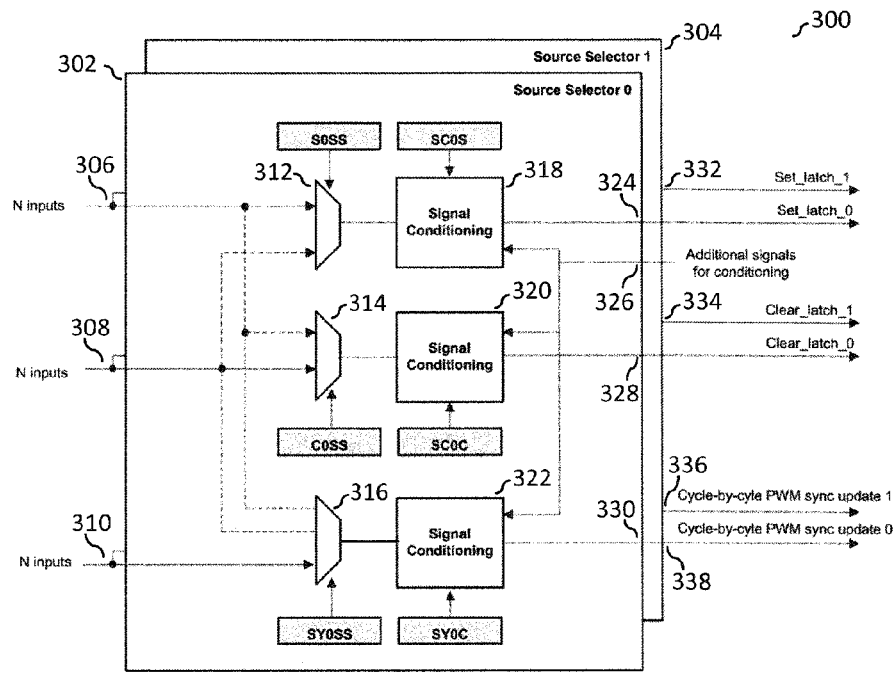
FIG. 3A shows an optional conditioning circuit according to various embodiments and FIG. 3B shows a more detailed view of the controller circuit for controlling the generation of the PWM signal for a switched mode power supply shown in FIG. 2.
Figure 3B:
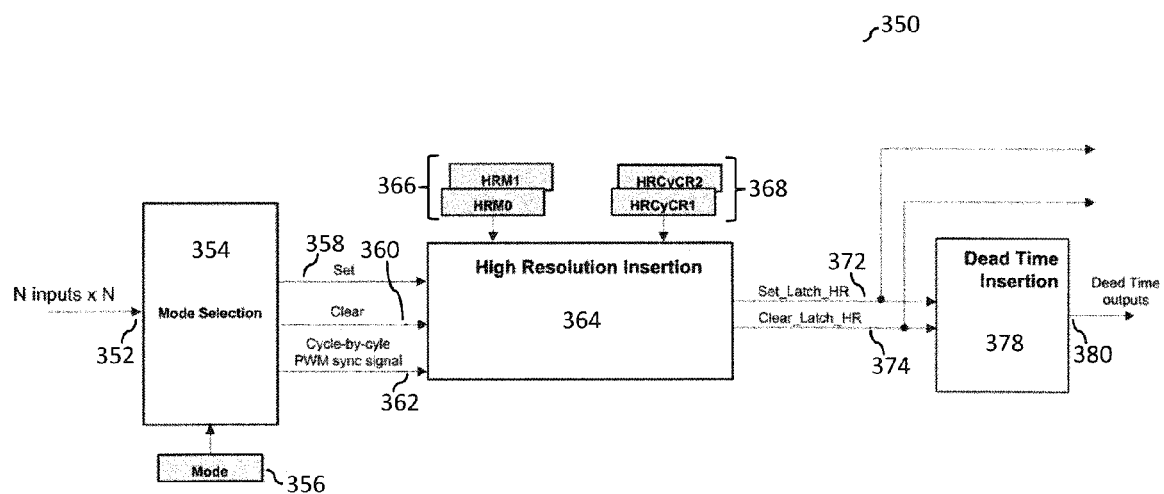

FIG. 3A shows an optional conditioning circuit 300 according to various embodiments and FIG. 3B shows a more detailed implementation of a circuit 350 for controlling the generation of the PWM signal for a switched mode power supply according to various embodiments.

The conditioning circuit 300 according to various embodiments may include a first signal source 302 and a second signal source 304. In FIG. 3A only the first signal source 302 is displayed all will be described in detail since the second signal source 304 may have an identical implementation. Every aspect described with regard to the first signal source 302 may therefore be analogously applied to the second signal source 304. The first signal source 302 may include a first input terminal 306, a second input terminal 308 and a third input terminal 310, wherein those input terminals may be configured as multipath input terminals. A first set of N input signals may be applied to the first input terminal 306 of the first signal source 302, a second set of N input signals may be applied to the second input terminal 308 of the first signal source 302 and a third set of N input signals may be applied to the third input terminal 310 of the first signal source 302. The first set of N input signals and the second set of N input signals may include signals generated by comparators and timers, for example. The third set of N input signals may include synchronisation signals, wherein each synchronisation signal may be associated with its corresponding input signal from the first N input signals and from the second N input signals. From the signals provided to the signal sources, the PWM signal(s) may be derived by the controller for controlling the generation of the PWM signal for a switched mode power supply according to various embodiments. The first set of N input signals may be applied to a first multipath input terminal of a first multiplexer 312 and optionally to a first multipath input terminal of a second multiplexer 314 and to a first multipath input terminal of a third multiplexer 316. The second set of N input signals may be applied to a second multipath input terminal of the first multiplexer 312, and optionally to a second multipath input terminal of the second multiplexer 314 and to a second multipath input terminal of the third multiplexer 316. The dashed lines between the first input terminal 306 and the multiplexers and the dashed lines between the second input terminal 308 and the multiplexers indicate optional or alternative connections which may depend on the actual setup of the system connections. The third set of N input signals may be applied to a third input of the third multiplexer 316. The multiplexers provided in the first signal source 302 are configurable by configuration parameters which may be provided to each of the multiplexers at their respective control input(s). An output of the first multiplexer 312 may be coupled to an input of a first signal conditioning circuit 318. An output of the second multiplexer 314 may be coupled to an input of a second signal conditioning circuit 320. An output of the third multiplexer 316 may be coupled to an input of a third signal conditioning circuit 322. The signal conditioning circuits, which are optional components, may be configured to process the signals applied to their inputs in accordance with configuration information in the form of additional signals for conditioning applied to a further input 326 of the first signal source 302. Each of the signal conditioning circuits may include logic in the form of edge selectors, AND gates, OR gates and/or pattern detectors, for example to provide suitable signal processing/conditioning functionality. For example, the signal conditioning circuit(s) may be provided in order to choose whether rising edges or falling edges of the corresponding signals provided to the respective signal conditioning circuits are to be selected as the basis for the generation of set/clear signals. Each of the signal conditioning circuits may be coupled to a respective output of the first signal source 302, i.e. the first signal conditioning circuit 318 may be coupled to a first output 324 such that a first set signal Set_latch_0 may be provided thereat, the second conditioning circuit 320 may be coupled to a second output 328 such that a first clear signal Clear_latch_0 may be provided thereat and the third conditioning circuit 322 may be coupled to a third output 330 such that a first cycle by cycle PWM synchronisation update signal may be provided thereat. The second signal source 304 may have the same internal structure and therefore have a first output 332 at which a second set signal Set_latch_1 may be provided, a second output 334 at which a second clear signal Clear_latch_1 may be provided and a third output at which a first cycle by cycle PWM synchronisation update signal may be provided. The conditioning circuit 300 shown in FIG. 3A presents one possible exemplary embodiment of a circuit which, from a functional point of view, may be seen as a generic signal conditioning circuit.

In FIG. 3B a more detailed view of the controller circuit for controlling the generation of the PWM signal for a switched mode power supply according to various embodiments is shown. The circuit 350 for controlling the generation of the PWM signal for a switched mode power supply according to various embodiments may include a mode selection circuit 354. The mode selection circuit 354 may be configured to receive N batches of N input signals 352 and a mode parameter 356. The mode selection circuit 354 may include the conditioning circuit 300 according to various embodiments. Therefore, the mode selection circuit 354 may be configured to output a selected set signal 358, a selected clear signal 360 and a selected cycle by cycle PWM synchronization update signal 362. In other words, the mode selection circuit 354 may be configured to provide a selected set signal 358, a selected clear signal 360 and a selected cycle by cycle PWM synchronization update signal 362. The mode parameter 356 may contain information about the operation mode of the SMPS and the selection process of the selected set signal 358, the selected clear signal 360 and the selected cycle by cycle PWM synchronization signal 360 taking place within the mode selection circuit 354.

The mode selection circuit 354 may be coupled to a high resolution insertion circuit 364 which may be configured to receive the selected set signal 358, the selected clear signal 360 and the selected PWM synchronisation update signal 363 for the cycle by cycle PWM signal configuration update The high resolution insertion circuit 364 may be further configured to receive a first set of configuration parameters 366 and a second set of configuration parameters 368 The first set of configuration parameters 366 may define which type of adjustment is used for each of the different operating modes of the SMPS converter, for example whether only the selected set signal 358 is adjusted, whether only the selected clear signal 360 is adjusted or weather both the set signal 358 and the clear signal 360 are adjusted. The second set of configuration parameters 368 may be used to define adjustment values for the set signals and the clear signals of the PWM signal. The high resolution insertion circuit 364 may configured to output a high resolution set signal 372 and a high resolution clear signal 374 which may be used to set a state of an output latch. The output latch may be set and reset by the high resolution set signal 372 and the high resolution clear signal 374 such that at least one switching signal, for example the PWM signal, may be output by the output latch in order to control the at least one power switch provided in the SMPS converter. However, the high resolution set signal 372 and the high resolution clear signal 374 may also be applied to a dead time insertion circuit 378 for the case where at least two output signals need to be generated within a certain distance of each other. In other words, the dead time insertion circuit 378 may be configured to generate a delay between two output signals and output those at its output 380.

The high resolution insertion circuit 364 may be configured to generate the high resolution set/clear signals 372, 374 for the output latch (not shown in FIG. 3B) The generation of the high resolution set/clear signals 372, 374 for the output latch may be updated cycle by cycle, i.e. in or for every switching cycle of the SMPS converter. The high resolution insertion circuit 364 may be further configured to adjust the selected set and/or the clear signal (or both, depending on the information contained in the first set of configuration parameters 366) with a picosecond resolution. The used adjustment values may be different for the selected set signal 358 and/or the selected clear signal 360 and may be controlled by the second set of parameters 368. In accordance with various embodiments, the adjustment performed by the high resolution insertion circuit 364 may include shifting (i.e. bringing forward or delaying) the selected set signal 358 and/or selected clear signal 360 by an adjustment value on a picosecond timescale. The value for the adjustment may be updated in a cycle by cycle manner. For example, in one switching cycle the set signal may be adjusted by 350 picoseconds and in the following switching cycle the set signal may be adjusted by 150 picoseconds. The update of the corresponding adjustment value may be performed via software by writing/updating the second set of parameters 368. The cycle by cycle update of the adjustment values is then synchronized with the currently used signal PWM sync update signal 362.

Figure 4:
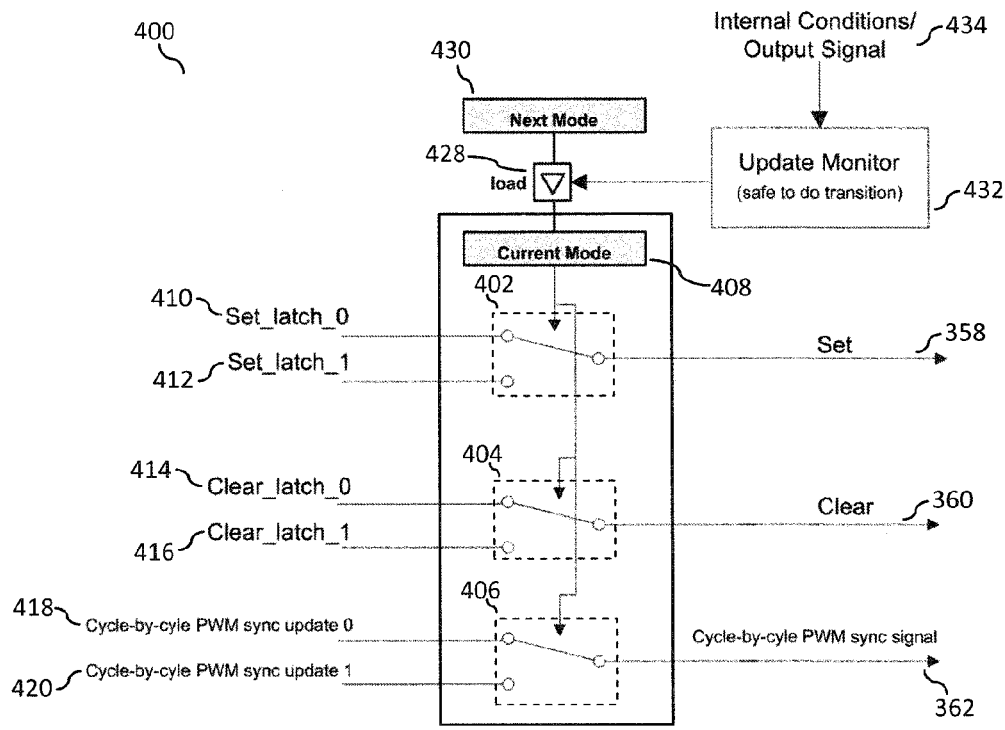
FIG. 4 shows a selecting circuit according to various embodiments.

In FIG. 4 a selecting circuit 400 according to various embodiments is shown which may be included in the mode selecting circuit 354. The mode selecting circuit 400 may include a first switching member 402, a second switching member 404 and a third switching member 406. The first set signal 410 (Set_latch_0) may be coupled to a first input of the first switching member 402, the second set signal 412 (Set_latch_1) may be coupled to a second input of the second switching member 402. The first clear signal 414 (Clear_latch_0) may be coupled to a first input of the second switching member 404, the second clear signal 416 (Clear_latch_1) may be coupled to a second input of the second switching member 404. The first PWM synchronisation update signal 418 (cycle-by-cycle PWM sync update 0) may be coupled to a first input of the third switching member 406, the second PWM synchronisation update signal 420 (cycle-by-cycle PWM sync update 1) may be coupled to a second input of the third switching member 406. In this exemplary embodiment it is assumed that two signal sources are provided in the SMPS converter (case shown in FIG. 2) and hence the selecting circuit 350 may be configured to select either signals from the first signal source (this configuration is shown in FIG. 4), i.e. the first set signal 410, the first clear signal 414 and the first PWM synchronisation update signal 418, or signals from the second signal source 304, i.e. the second set signal 412, the second clear signal 416 and the second PWM synchronisation update signal 420. The selected signals are output as the selected set signal 358, the selected clear signal 358 and the selected PWM synchronisation update signal 362 for further processing by the high resolution insertion circuit 364. The state of the three selecting members 402, 404, 406 may be determined by the mode parameter 356 provided to the mode selection circuit 354 which may be a software signal or a hardware signal. The implementation of the selecting circuit 400 shown in FIG. 4 uses actual switches. In alternative embodiments the switching functionality may be combined with the signal sources, for example in the form of an AND gate and an OR gate, for example. The AND gate may be used to enable the respective signal source and the OR gate may be used to be able to process multiple signals at the same time. The state of each of the selecting members may be defined by a current mode parameter 408 indicating the current operation mode of the SMPS converter. The current mode parameter 408 may correspond, for example, to value, for example a digital word, stored in a register. The current mode parameter 408 may be updated with the value of a next mode parameter 430 indicating the operation mode of the SMPS converter for/during the next switching cycle. By updating the value of the current mode parameter 408, the used resource (the first signal source or the second signal source, for example) may be adapted in accordance with a change of the operating mode (and/or the modulation technique) of the associated SMPS converter. The replacement of the current mode parameter 408 with the next mode parameter 430 may be controlled by a gating element 428 which in turn is controlled by an update monitor 432. The update monitor 432 is configured to initiate an update process when a safe transition may be performed, for example when a high resolution adjustment of the current PWM switching cycle, i.e. the high resolution adjustment of the corresponding set signal and clear signal, is not in process and the second set of parameters 368. In order to decide whether it is "safe" to perform the update, i.e. shift the next mode parameter 430 value from the next mode register into the current mode register, the update monitor 432 may receive information 434 about internal conditions and/or about the state of the second set of parameters 368.

Figure 5:
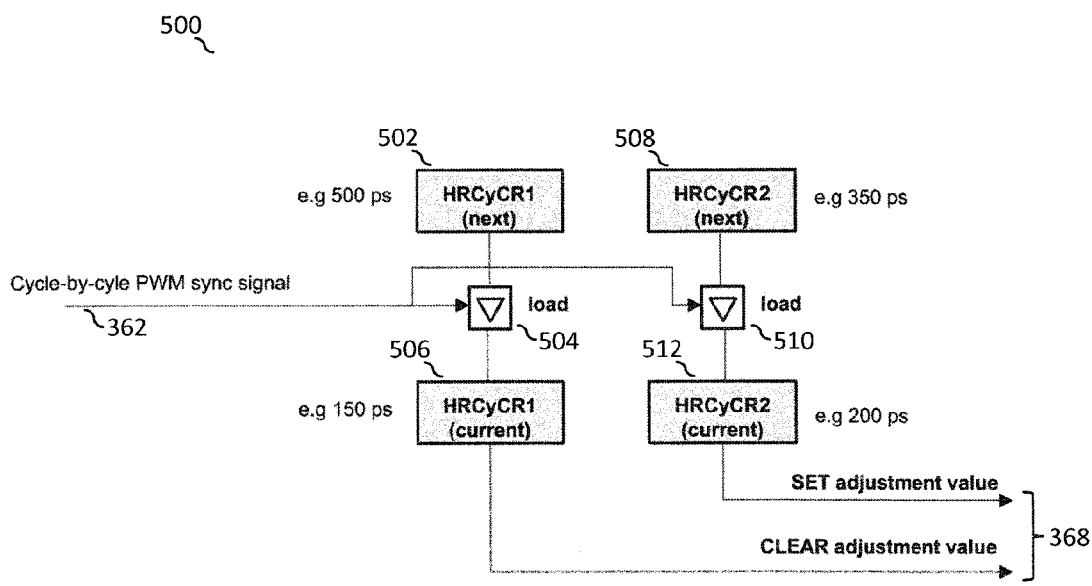
FIG. 5 shows an update signal processing circuit according to various embodiments.

In FIG. 5 an update signal processing circuit 500 according to various embodiments is shown. The update signal processing circuit 500 may be provided in the high resolution insertion circuit 364. The update signal processing circuit 500 may be configured to synchronise the update of the adjustment values for the selected set signal 358 and/or the selected clear signal 360 with the PWM synchronisation update signal 362 which may be output by the selecting circuit 400 shown in FIG. 4. The current set signal adjustment value 506 and the current set signal adjustment value 512 may be each stored in a corresponding register. The update/replacement of the current set signal adjustment value 506 by the next set signal adjustment value 502, which may correspond to a value stored in a register, may be triggered by a first gating element 504 in accordance with the PWM synchronisation update signal 362. In an analogous manner, the update/replacement of the current clear signal adjustment value 512 by the next clear signal adjustment value 508, which may correspond to a value stored in a register, may be triggered by a second gating element 510 in accordance with the PWM synchronisation update signal 362. The current set signal adjustment value 506 and the current clear signal adjustment value 512 may be then used by the high resolution insertion circuit 364 as the second set of configuration parameters 368 to adjust the selected set signal 358 and/or the selected clear signal 360 (or both) in the current switching cycle of the SMPS converter.

Exemplary adjustment values for each of the parameters are given in FIG. 5 In a currently running switching cycle, the set signal may be adjusted by 200 picoseconds and the clear signal may be adjusted by 150 picoseconds. In a following switching cycle, the set signal may be adjusted by 350 picoseconds and the clear signal may be adjusted by 500 picoseconds. By means of the update signal processing circuit 500 a glitch free PWM signal may be obtained during a transition between two different sets of selected set/clear signals, i.e. when the operating mode of the SMPS converter or the used modulation technique is changed. The switching between different signal sources may be performed dynamically without introducing glitches in the high resolution set/clear signal 372, 374.

Figure 6:
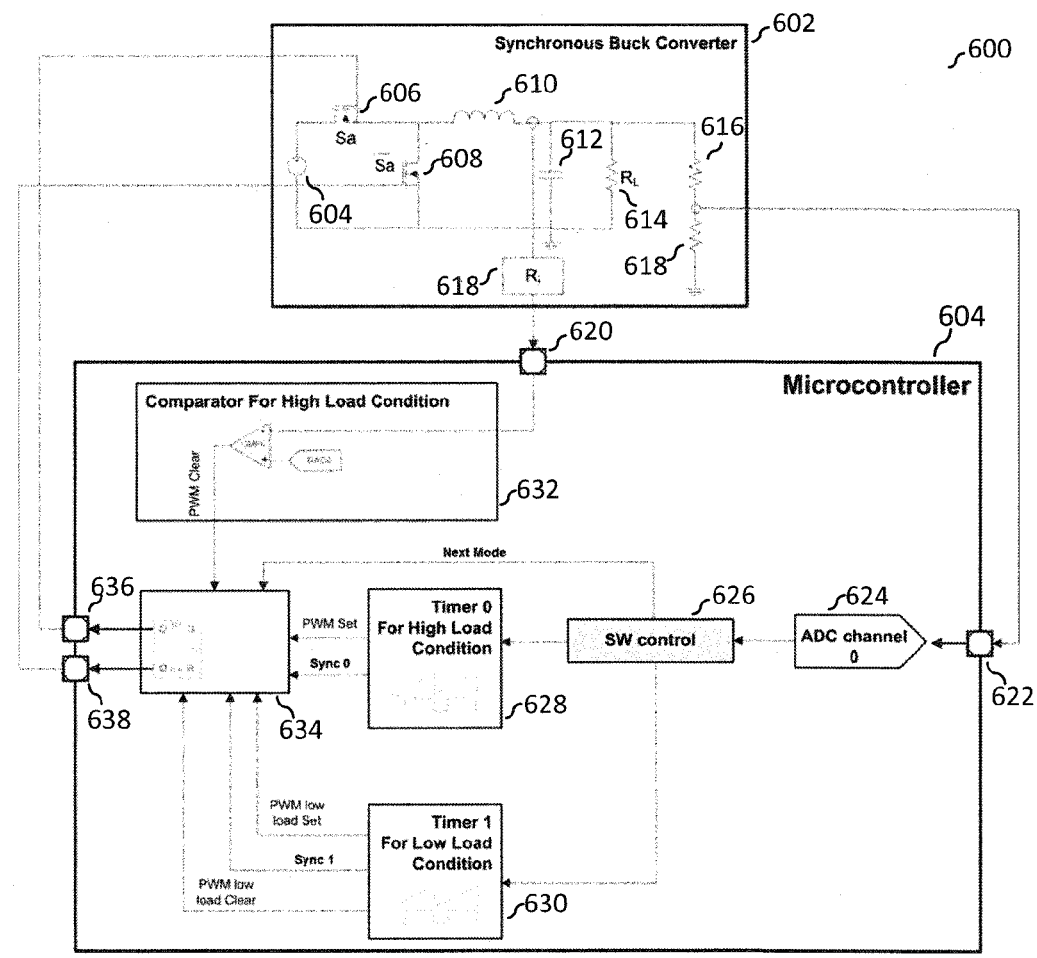
FIG. 6 shows a SMPS converter according to various embodiments.

In FIG. 6 an exemplary application of the controller circuit for controlling the generation of the PWM signal for a switched mode power supply (or the circuit for controlling the same) according to various embodiments is shown. The exemplary SMPS converter 600 shown in FIG. 6 may include a synchronous buck converter 602 and a microcontroller 604 which may be configured to monitor and control the operation of the SMPS converter 600. The SMPS converter 600 may be configured to operate in one of two modes: a first mode which may correspond to a normal load operation mode and a second mode which may correspond to a low load operation mode. It is to be noted that this is one exemplary scenario of very m any possible configuration scenarios such that an SMPS converter which is controlled by the circuit according to various embodiments may have more than two preset operation modes. Furthermore, the synchronous buck converter 602 may be replaced with any other converter topology of a non-isolated type, for example a buck converter, a boost converter or a buck-boost converter, or by any other converter topology of an isolated type, for example a flyback converter, a (resonant) forward converter or a push pull converter. The SMPS converter 600 may be operated in any one of those modes and the current operation mode thereof may be switched on the fly with high resolution control maintained between the operation cycles of the SMPS converter 600.

The synchronous buck converter 602 may include a power supply 604 coupled to one drain/source terminal of a first transistor 606. The other drain/source terminal of the first transistor 606 may be coupled to one terminal of an inductor 610 and to a reference potential, e.g. the ground potential, via a second transistor 608. A gate terminal of the first transistor 606 may be coupled to a first output of a microcontroller 604 and a gate terminal of the second transistor 608 may be coupled to a second output of the microcontroller 604. The other terminal of the inductor 610 may be coupled to one terminal of a capacitance 612, to one terminal of a fourth resistor 618, to one terminal of a first resistor 614 and to one terminal of a second resistor 616. The other terminal of the fourth resistor may be coupled to a first input 620 of the microcontroller 604. The other terminal of the capacitance 612 and the other terminal of the first resistor 614 may be coupled to the reference potential, e.g. the ground potential. The other terminal of the second resistor 616 may be coupled to a second input 622 of the microcontroller 604 and to one terminal of a third resistor 618. The other terminal of the third resistor may be coupled to the reference potential.

The first transistor 606 and the second transistor 604, which may for example be configured as field effect transistors, may form a power stage. The two transistors are arranged in a half-bridge configuration, wherein the first transistor 606, when conducting, connects the input voltage from the power supply 604 to the load (represented by the first resistor 614), and the second transistor 608 connects, when conducting, the reference potential to the load. The two transistors may be controlled by the switching signals provided by the microcontroller 604 such that they produce the duty-cycle modulated square wave that may be low-pass filtered by the capacitor 612 thus resulting in the output voltage provided to the load. The second transistor 608 may act as a synchronous rectifier. The voltage across the inductor 610 may be sampled/monitored via the fourth resistor 618 and applied to the first input 620 of the microcontroller 604. The second resistor 616 and the third resistor 618 may be configured as a voltage divider sampling the output voltage and providing a scaled value thereof at the second input 622 of the microcontroller. In an alternative embodiment, the second transistor 608 in the synchronous buck converter 602 may be replaced by a diode.

The microcontroller 604 may include an ADC (analog-to-digital converter) 624 coupled between the second input 622 and a software control circuit 626. A first output of the software control circuit 626 may be coupled to a first timer 628 and a second output of the software control circuit 626 may be coupled to a second timer 630. Those connections indicate that the software control circuit 626 may be configured to control those resources. The first timer 628 may be a timer providing set signals for the normal load operation mode. The first timer 628 may be coupled to the circuit 634 according to various embodiments. The second timer 630 may be a timer providing a set of signals (set signals and clear signals) for the low load operation mode. The second timer 628 may have a first output and a second output coupled to the circuit 634 according to various embodiments. The first input 620 of the microcontroller 604 may be coupled to an input of a comparator 632. An output of the comparator 632 may be coupled to the circuit 634 according to various embodiments. The circuit 634 according to various embodiments may have a first output which is coupled to the first output of the microcontroller 604 and a second output which is coupled to the second output of the microcontroller 604.

The microcontroller 604 may be seen to include two controlling instances. The first controlling instance includes the comparator 632 and the first timer 628. The comparator 632 compares the sampled voltage (corresponding to the current through the inductor 610 multiplied by the value of the fourth resistor 618) applied to the first input 620 with a threshold value. When the sampled voltage exceeds the threshold value, the comparator 632 may generate a first clear signal (PWM clear) which is provided to the circuit 634 according to various embodiments. A first set signal (PWM set) and a first PWM synchronisation update signal (Sync 0) may be generated by the first timer 628 and provided to the circuit 634 according to various embodiments at the beginning of every switching cycle of the SMPS converter 600. On the basis of the first set signal and the first clear signal the circuit 634 according to various embodiments may generate corresponding switching signals, for example the PWM signals, which may be output from the first output 636 and the second output 638 and applied to the gate region of the first transistor 606 and to the gate region of the second transistor 608, respectively. Using the terminology introduced with reference to FIG. 1, those signals belong to the first set of signals which may be used whenever the synchronous buck converter 602 operates under normal load conditions.

The operation of the SMPS converter 600 in a low load condition may be controlled by the second timer 630. The second timer 630 may be configured to generate a second set signal (PWM low load set), a second clear signal and a second PWM synchronisation update signal (Sync 1) and provide those to the circuit 634 according to various embodiments. Therefore, using the terminology introduced with reference to FIG. 1, those signals belong to the second set of signals.

The switching between the first signal source and the second signal source, i.e. in this exemplary embodiment the comparator 632 in combination with the first timer 628 and the second timer 630, respectively, may be performed by the software control circuit 626 which may reconfigure the selecting circuit inside the circuit 634 according to various embodiments in the manner already described with respect to FIG. 2, for example. In other words, the software control circuit 626 may provide the value of the next mode parameter 430 (see FIG. 4) indicating the operation mode of the SMPS converter 600 for/during the next switching cycle to the circuit 634 according to various embodiments. Furthermore, the software control circuit 626 may be configured to provide the second set of parameters 368 to the circuit 634 according to various embodiments (not explicitly shown in FIG. 6). By reconfiguring the selecting circuit 400, the signal source connected to the high resolution insertion circuit 364 may be selected. During such a transition, the set/clear signals and the corresponding PWM synchronisation update signal are switched.

The operation of the circuit 634 according to various embodiments provided in the microcontroller 604 of the exemplary SMPS converter 600 shown in FIG. 6 will be now explained in more detail with reference to diagrams 700 and 750 shown in FIGS. 7A and 7B, respectively, in which various graphs are shown. All graphs included in diagram 700 and in diagram 750 share a common x-axis 702 which represents time. However, an actual scaling is omitted as the focus will lie on a qualitative explanation. The y-axes for each of the graphs are not shown, however, the vertical spread of each signal represented by the corresponding graph shall denote its amplitude.

In the following, the graphs included in FIG. 7A will be described. A first graph 704 represents the current of the inductor 610 in the synchronous buck converter 602 in FIG. 6. As can be seen, the inductor current 704 features the typical triangular form with a rising slope whenever the first transistor 606 is in a conducting state and with a declining slope whenever the first transistor 606 is in a non-conducting state. A second graph 706 represents a ramp signal. In general, the ramp signal 706 may be needed in peak current control mode to avoid instabilities within the control loop when the duty cycle exceeds 50%. The ramp signal 706 may be compared to the inductor voltage 704 by the comparator 632 in the microcontroller 604 in FIG. 6. Whenever both signals are equal, a first clear signal 720 may be output by the comparator 632. A first dashed line 708 marks the preset value Vc which corresponds to the value of the inductor current 704 at which a first clear signal is to be generated. By adjusting the slope of the ramp signal 706, the value of the preset value Vc may be adjusted which in turn affects the duty cycle of the PWM signal 714 of the SMPS converter. The first clear signal 720 may cause the PWM signal which is represented by the fourth graph 714 to assume its low value, for example to zero, such that a trailing edge is generated in the PWM signal 714. A first set signal 722 may be produced at every beginning of a switching cycle of the SMPS converter which may be determined by a restart of the first timer signal represented by a third graph 710. A switching cycle of the SMPS converter during a first phase A may be defined by the time it takes the first timer signal 710 which is a ramp signal to reach its maximum value, beginning from its starting value. In other words, one switching cycle of the SMPS converter during the first phase A may correspond to the time spanned by the ramp signal between two reset points, i.e. the time span between two consecutive first set signals 722. As can be seen, the first set signal 722 manifests itself in a rising edge in the PWM signal 714. The PWM signal 714 may have the typical PWM signal form of a square wave signal, wherein a high value of the PWM signal 714 may render the first switch 606 into a conducting state and a low value of the PWM signal 714 may render the first switch 606 into a non-conducting switch (the second switch 608 assuming the opposite state with respect to the state of the first switch 606).

During a normal load operation mode, marked by the first phase A in diagram 700, the first timer 628 may generate the first set signal and the comparator 632 may generate the first clear signal.

Figure 7A:
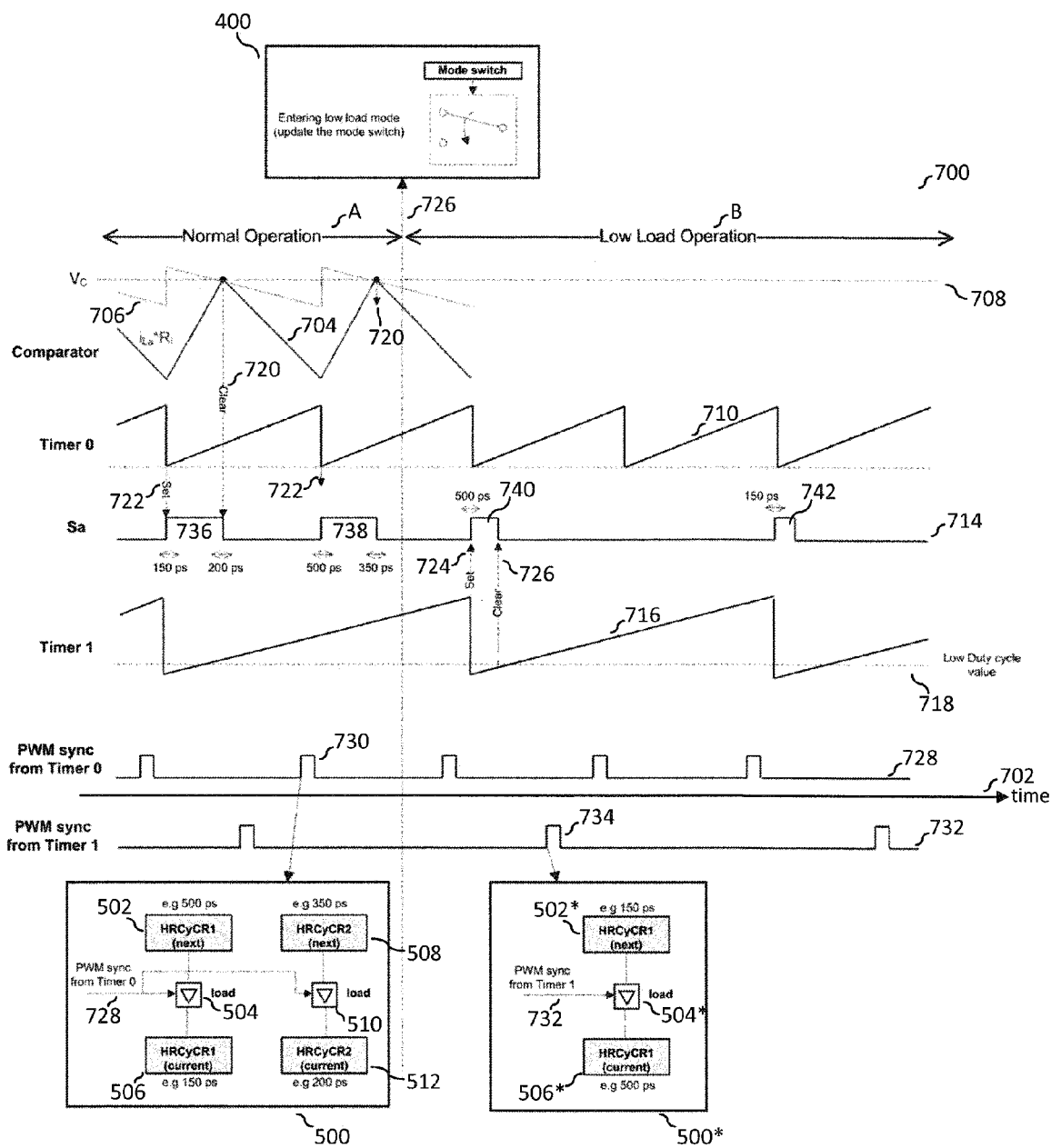

At a certain point in time, marked by a vertical dashed line 726, the operation mode of the SMPS converter according to various embodiments may be switched to a low load operation mode marked by a second phase B in diagram 700 in FIG. 7A. The switching over to the low load operation mode (or more generally to a different operation mode than the operation mode of the first phase A) may be initiated by the software control circuit 626 switching the mode parameter 356 (see FIG. 3B) to a different value. This reconfigures the state of the selecting members provided in the selecting circuit 500 according to various embodiments shown in FIG. 5 such that a different signal source from the signal source used during the first phase A is selected. From that point on, the set of signals from the signal source associated with the low load operation mode is used and thus the second timer 630 may gain control of the generation of the set/clear signals in order to obtain the PWM signal 714. The second timer signal is represented by a fifth graph 716 which is a ramp signal with a predefined (adjustable) slope. Whenever the second timer signal 716 is reset, a second set signal 724 is generated. The time between two consecutive resets of the second timer signal 716 defines the switching cycle which may be controlled by adjusting the slope of the second timer signal 716. The value of the second timer signal 716 is compared to a low load threshold value marked by a third dashed line 718 and whenever those two signals have equal values, a second clear signal 726 is generated by the second timer 630 and provided to the circuit 634 according to various embodiments. Just as during the first phase A, the second set signal 724 and the second clear signal 726 define the duty cycle of the PWM signal 714. As can be seen from a comparison of the PWM signal 714 during the first phase A and the second phase B, the PWM signal 710 during the first cycle length has a shorter cycle length with a higher duty cycle.

The edges of the first three PWM pulses in the PWM signal 714 are labelled with exemplary adjustment values. The timings of the PWM pulses based on set signals and clear signals from a selected set of signals (from a selected signal source) may need to be shifted in time in order to maintain a picosecond resolution of the PWM signal 714 both during the first phase A and during the second phase B.

In the exemplary scenario presented in FIG. 7A, the set signal adjustment value for the first PWM pulse 736 in the PWM signal 714, i.e. the time by which the rising edge of the first PWM pulse 736 in the PWM signal 714 needs to be shifted, may be 150 picoseconds and the clear signal adjustment value for the first PWM pulse 736 in the PWM signal 714, i.e. the time by which the falling edge of the first PWM pulse 736 in the PWM signal 714 needs to be shifted, may be 200 picoseconds. In a similar fashion, the set signal adjustment value for the second PWM pulse 738 in the PWM signal 714 may be 500 picoseconds and the clear signal adjustment value for the second PWM pulse 738 in the PWM signal 714 may be 350 picoseconds. Those values, being merely non-restricting exemplary values, may be calculated by the software control circuit 626 of the circuit SMPS converter 600 according to various embodiments shown in FIG. 6. The first PWM pulse 736 and the second PWM pulse 738 in the PWM signal 714 are derived from signals from a signal source which is used during the normal operation mode, for example the first timer 628 in FIG. 6. The adjustment values for a next switching cycle may be updated at any time in a preceding switching cycle. The update process may be initiated/triggered by the PWM synchronisation update signal, which during the first phase A may correspond to the PWM synchronisation update signal from the first timer 628 in FIG. 6 (first sync update signal in the following) which is represented by a sixth graph 728 in FIG. 7A. That is, a pulse in the PWM synchronisation update signal (for example its rising edge) may trigger the update signal processing circuit 500 to update the adjustment values. This process will be described in more detail in the following.

With the occurrence of a first pulse 730 in the first sync update signal 728 which precedes the first PWM pulse 736 in time, the adjustment values for the first PWM pulse 736 may be updated, i.e. the current set signal adjustment value 506 may be set to 150 picoseconds and the current clear signal adjustment value 512 may be set to 200 picoseconds. Those adjustment values may then be used to adjust (i.e. shift in time) the rising edge and the falling edge of the first PWM pulse 736. With the occurrence of the second pulse 731 in the first sync update signal 728 which precedes the second PWM pulse 738, the adjustment values for the second PWM pulse 738 may be updated again.

The state of the variables within the update signal processing circuit 500 (the variables corresponding to the adjustment values) shortly before the second pulse 731 in the first sync update signal 728 is shown in the small inlay diagram in the lower left corner of FIG. 6. The current adjustment values 506, 512 are 150 picoseconds and 200 picoseconds, corresponding to the adjustment values of the first PWM pulse 736 used in the current switching cycle. The second pulse 731 may trigger the update signal processing circuit 500 to update those values for the second PWM pulse 738. As can be seen, the next set signal adjustment value 502 corresponds to 500 picoseconds and the next clear signal adjustment value 508 corresponds to 350 picoseconds, both again being merely non-restricting exemplary examples. Upon occurrence of the second pulse 731 in the first sync update signal 728, the current adjustment values are replaced with the next adjustment values. This may be performed by means of the first and second gating elements 504, 510 which may allow a shift of values from one set of registers holding the next adjustment values into another set of registers holding the current adjustment values. Consequently, the rising edge and the falling edge of the second PWM pulse 738 are adjusted by 500 picoseconds and 350 picoseconds, respectively.

At the time marked by the vertical dashed line 726, the operation mode of the SMPS converter according to various embodiments is switched from the normal operation mode to a low load operation mode. Therefore, a different signal source is used from then on, for example the second timer 630 and the comparator 632, as basis for the generation of the PWM signal 714. In a seventh graph 734 a second PWM synchronisation update signal from the second signal source (second sync update signal 734 in the following) is shown. At the time marked by the dashed line 726, the selecting circuit 400 switches from the first signal source to the second signal source. Consequently, the pulses in the second sync update signal 732 dictate when adjustment values are updated and the pulses in the first sync update signal 728 are disregarded.

The first set of configuration parameters 366 may be used to define weather the set signal, the clear signal or both need to be adjusted. In this exemplary embodiment, during the second phase B only the set signal 724 is adjusted. Since the first signal source is no longer used for the generation of the PWM signal 728, a third pulse 732 in the first sync update signal 728 is ignored by the circuit 634 according to various embodiments even though it occurs before the first pulse 735 in the second sync update signal 734. As the adjustment values are not updated between the second PWM pulse 738 and the third PWM pulse 740 due to a lack of a corresponding occurrence of a pulse in the second sync update signal 728, the set signal adjustment value of 500 picoseconds is used for the adjustment of the rising edge of the third PWM pulse 740. The small diagram inlay in the lower right corner of FIG. 7A shows the state of state of the variables within the update signal processing circuit 500* shortly before the first pulse 735 in the second sync update signal 734. Here, only the set signal adjustment value branch is shown as in this exemplary case the clear signal adjustment value is not adjusted during the second phase B. The current set signal adjustment value 506* is 500 picoseconds (corresponds to the value that has been used for the third PWM pulse 740) and the next set signal adjustment value 502* is 150 ps. Upon occurrence of the first pulse 735 in the second sync update signal 734, the current set adjustment value 506* is replaced with the next set adjustment value 502*. Consequently, the rising edge of a fourth PWM pulse 742 is adjusted by 150 picoseconds.

By means of the circuit 634 according to various embodiments a PWM signal with a picosecond resolution may be generated based on at least one set of set signals and clear signals provided by a signal source. By precise cycle by cycle adjustment of the PWM pulses, the PWM signal may be kept synchronous with a selected signal source. Furthermore, the switching between different signal sources may be performed dynamically and glitch-free during the operation of the corresponding SMPS converter—a readjustment, resetting or restarting of the corresponding SMPS converter is not necessary.

A diagram 750 shown in FIG. 7B shows the same graphs in the same order as the diagram 700 in FIG. 7A. The difference between the two diagrams is that the diagram 750 shows an exemplary scenario in which the SMPS converter operates in a low load operation mode during a first phase B, wherein the operation mode is switched to the normal operation mode (second phase A) at a time marked by the vertical dashed line 752. That is, diagram 750 in FIG. 7B shows the reverse transition with respect to the transition shown in FIG. 7A. During the first phase B, which may correspond to a low load operation mode of the SMPS converter, the second timer signal 716 dictates the duty cycle of the PWM signal 714. During the second phase A, which may correspond to a high load operation mode of the SMPS converter, the first timer signal 710 and the output signal (the clear signal 720) from the comparator 632 dictate the duty cycle of the PWM signal 714. All other aspects mentioned with regard to the diagram 700 shown in FIG. 7A may be analogously applied to the diagram 750 shown in FIG. 7B.

It is to be noted that in the preceding description of the diagram 700 the term "first" used with reference to set/clear signals is used to denote those set/clear signals which are generated on the basis of the set of signals provided by the first signal source, in this exemplary scenario the signal source used during the normal load operation phase corresponding to the first phase A. The term "second" used with reference to set/clear signals is used to denote those set/clear signals which are generated on the basis of the set of signals provided by the second signal source, in this exemplary scenario the signal source used during the low load operation phase corresponding to the second phase B. In addition, the terms set signal and clear signal which are additionally marked with small vertical arrows in diagram 700 in FIG. 7 refer to events taking place at certain points in time. All the other signals which are referred to in the context of FIG. 7A, such as the ramp signal 706 or the PWM signal 714, and which are represented by corresponding graphs are actual signal sequences which are spread in time.

FIGS. 8A to 8C show diagrams representing typical control schemes in SMPS applications. The signals in the corresponding diagrams are shown without an actual scaling as they merely serve for a qualitative explanation. However, the horizontal dimension for every signal sequence shall represent a time domain and the vertical dimension for every signal sequence shall represent a domain of the magnitude of the corresponding signal.

In diagram 800 in FIG. 8A a ramp signal 802 is shown. The beginning of the ramp signal 802 may be defined by a set point of a timer signal 806. The term ramp signal may in general refer to the a signal, starting at a starting value and ending at an end value with a continuous transition therebetween. The time it takes the signal to change from the starting value to its end value may define one cycle of the ramp signal. The ramp signal may be generated in loops, i.e. at the end of one cycle the ramp signal may be reset from its end value to its start value another cycle may follow where the ramp signal is generated again, starting at the start value. Therefore, the continuous form of the ramp signal may have a sawtooth form, each tooth corresponding to one cycle of the ramp signal. The ramp signal 802 in FIG. 8A, for example, features two sawteeth corresponding to two cycles, each containing a ramp signal. In general, a ramp signal may have a declining slope or an increasing slope, depending on whether the start value of the ramp signal is larger or smaller than the end value of the ramp signal. The exemplary ramp signal 802 shown in FIG. 9 is one with an increasing slope.

The ramp signal 802 in FIG. 8A is initiated by the set point and in this example continues to grow from there on. A voltage 810, which may be a voltage output by a current error amplifier, is compared to the ramp signal 802 and a point 808, where the voltage 810 and the ramp signal 802 are equal, may correspond to a clear point. The set point and the clear point may define the positions of a rising edge and a trailing edge of a PWM signal 804 used, for example, to control power switches in a DC/DC converter such as a SMPS. By adjusting the slope of the ramp signal 802, the clear point may be moved in time within one cycle, i.e. its temporal location may be adjusted in order to optimize the operation of the DC/DC converter. Moving the clear point in time corresponds to altering the duty cycle of the PWM signal 804 which may in turn alter the output voltage and/or the output current provided by the corresponding DC/DC converter. The control scheme presented in FIG. 8A is commonly referred to as average current control.

In diagram 820 in FIG. 8B a similar control scheme is presented. However, instead of the current value from the current error amplifier (i.e. voltage 810) being compared to the ramp signal 802 as was the case in diagram 800 in FIG. 8A, a sensed current 830 ($I_L$), which may be a current sensed at the inductor of the corresponding SMPS for example, is compared to a ramp signal 822 which in this example features a decreasing slope. In analogy to the control scheme presented in FIG. 8A, a timer signal 816 is provided such that its set points define the beginnings of new cycles of the ramp signal 822. Clear points are set at intersection points 818 in time when the sensed current 830 is equal to the value of the ramp signal 822. Also, set points and clear points coincide with rising edges and trailing edges, respectively, of the PWM signal 814. The control scheme shown in FIG. 8B is referred to as trailing edge modulation as the trailing edge of the signal controlling the power switch(es) in the SMPS is modulated to achieve the duty cycle of the DC/DC converter needed in order to generate a desired output voltage/current. The trailing edge may correspond to the point in time when the corresponding power switch is being turned off.

In the control scheme presented in FIG. 8B, the value of the sensed current 830 being the "cause" for voltage in an DC/DC converter such as an SMPS is compared to the value of the ramp signal 822. By adjusting the slope of the ramp signal 822 the location of the intersection points 818 may be adjusted which defines the duty cycle of the PWM signal 814, just as in the previous control scheme presented in FIG. 8A.

In diagram 840 in FIG. 8C a further control scheme is presented. Here, the output voltage error signal 850 of the SMPS is compared with the ramp signal 842. The output voltage error signal 850 corresponds to the output signal of an error amplifier to which the output voltage of the SMPS is provided. As in the control schemes shown in FIG. 8A and FIG. 8B, at intersection points 808, where the ramp signal 842 is equal to the output voltage 850, clear signals are generated. Set signals coincide with the beginnings of new cycles of the ramp signal 842. From the thusly obtained set signals and clear signals a corresponding PWM signal 844 may be generated. Therefore, the intersections of the output voltage error signal 850 with the slope signal 842 define the duty cycle of the PWM signal 844. The main difference between the control scheme presented in FIG. 8C and the previously described control schemes (FIG. 8A and FIG. 8B) is that in this control scheme no information about the current flowing through the power switch(es) and/or the inductor in the SMPS is needed.

As will be described later on, the circuit according to various embodiments as well as the method according to various embodiments may be used to generate various high resolution ramp signals or, in other words, to emulate a high resolution slope generator. The high resolution ramp signals thus generated may be used as the ramp signals 802, 822, 842 such that control loops offering high precision and control speed may be realized.

According to various embodiments, a device and a method is presented for providing, by way of emulation, a digital hardware slope generator such that external components or a full software simulation providing an equivalent functionality may be replaced and/or simplified. According to various embodiments, a digital slope generator may be used and its output signal may be fed into a DAC.

In FIG. 9 a circuit 900 according to various embodiments is shown which may be configured as a high resolution digital slope generator providing a high resolution digital slope signal (high resolution digital ramp signal). The circuit 900 may include an input terminal 902 configured to receive a clock signal, wherein the clock signal may include a sequence of pulses. The clock signal may be derived from a clock generator (not shown in FIG. 1) and in its most common form it may, for example, be a square wave with a 50% duty cycle with a constant frequency which may be adjusted according to need. However, the clock signal may have any other suitable form such as a trapezoidal form, a triangular form or a sinusoidal form. The input terminal 902 may be coupled to an input of a bit inverting circuit 904 which may be configured to invert a digital word. Each digital word inverted by the bit inverting circuit 904 may correspond to a number describing a position of each pulse within the sequence of pulses included in the clock signal. The bit inverting circuit 904 may be configured to pass the inverted digital word(s) together with the clock signal provided at the input terminal 902 to a pulse swallowing circuit 906. The pulse swallowing circuit 906 may be configured to receive the clock signal together with the inverted digital word(s) and swallow at least one pulse from the sequence of pulses in the clock signal when a pulse swallowing condition for that pulse is satisfied. Thereby, the pulse swallowing circuit 906 may generate a modified clock signal on the basis of the clock signal provided at the input terminal 902 of the circuit 900 according to various embodiments and the inverted digital words provided by the bit inverting circuit 904. In other words, the pulse swallowing circuit 906 may be configured to decide which pulses are to be swallowed from subsequences of pulses in the clock signal by evaluating the inverted digital words provided by the bit inverting circuit 904. Alternatively, the bit inverting circuit 904 may be configured to provide other data than the inverted digital words to the pulse swallowing circuit 906 which may indicate to the pulse swallowing circuit 906 which pulses it is to swallow. In other words the bit inverting circuit 904 may be configured to determine which pulses are to be swallowed and to provide suitable data to the pulse swallowing circuit 906 indicating which pulses from a subsequence of pulses in the clock signal it is to swallow. In essence, the decision which pulses are to be swallowed may be made by the bit inverting circuit 904 itself (and then communicated to the bit swallowing circuit 906) or by the pulse swallowing circuit 906 (on the basis of data, for example the inverted digital words, provided to it by the bit inverting circuit 904). The pulse swallowing circuit 906 may then be coupled to a digital ramp generation circuit 908 configured to provide a high resolution digital ramp signal at the output 910 of the circuit 900 according to various embodiments based on the modified clock signal provided by the pulse swallowing circuit 906.

In the bit inverting circuit 904, the clock signal may be subdivided in subsequences of any number of pulses, for example in subsequences of 6 pulses, or in subsequences of 12 pulses, in subsequences of 15 pulses, or in subsequences of 24 pulses. However, any other suitable number of pulses forming a subsequence of pulses may be chosen. Each pulse in the subsequence of pulses may be assigned a number, i.e. the first pulse in the subsequence of pulses may be assigned a "0", the second pulse in the subsequence of pulses may be assigned a "1", the third pulse in the subsequence of pulses may be assigned a "2" and so on. Each number may be represented by a digital word including at least as many bits as necessary to represent the number of the last bit in the in the subsequence of pulses. That is, if a subsequence of pulses includes 12 or 16 pulses, for example, at least 4 bits may be required to identify each of the 12 or 16 pulses within the subsequence of pulses (as a 4 bit digital word may assume $4^2=16$ different values). If the subsequence of pulses includes 20 or 28 pulses, for example, at least 5 bits may be required to identify each of the 20 or 28 pulses within the subsequence of pulses (as a 5 bit digital word may assume $5^2=32$ different values). The method, for example in the form of an algorithm, according to which either the bit inverting circuit 904 or the pulse swallowing circuit 906 decides which pulses from a subsequence of pulses are to be swallowed will be explained later in more detail.

In FIG. 10 a further embodiment of the circuit 1000 according to various embodiments is shown which may be configured as a high resolution digital slope generator. The circuit 1000 according to various embodiments is based on the circuit 900 shown in FIG. 9, however it includes additional optional stages.

In analogy to the circuit 900 according to various embodiments shown in FIG. 9 the circuit 1000 according to various embodiments includes an input terminal 1002 at which a clock signal may be provided. The input terminal 1002 may be coupled to an optional clock prescaling circuit 1004 (also referred to as clock prescaler in the following) which may be configured to prescale the clock signal. For example, the clock prescaler 1004 may be configured to divide or multiply the clock signal provided at the input terminal 1002 of the circuit 1000 according to various embodiments by a natural number such as 2, 3, 5, 8, 12, for example. The prescaled clock signal from the clock prescaler 1004 may be provided to the pulse swallowing circuit 1006 (also referred to as pulse swallower in the following) and to the bit inverting circuit 1008, for example bit inverting logic. The bit inverting circuit 1008 may be configured in the same way as the bit inverting circuit 906 in the circuit 900 in FIG. 9 and may therefore provide inverted digital words (or equivalent data) to the pulse swallower 1006 on the basis of which the pulse swallower 1006 may decide which pulses may be swallowed from the subsequences of pulses contained in the prescaled clock signal. The pulse swallower 1006 may be coupled to a slope value decrement/increment stage 1012 and be configured to provide a modified clock signal, for example a slope generation clock 1010, to the slope value decrement/increment stage 1012. The slope value decrement/increment stage 1012 may be configured to decrement or increment a digital ramp word in accordance with the slope generation clock 1010 as will be explained later on in more detail. After every decrement or increment step the slope value decrement/increment stage 1012 may provide an actual slope value 1014 to an optional gain stage 1016, for example in the form of an digital word representing the actual slope value 1014. The slope value decrement/increment stage 1012 may be configured to provide the actual slope values 1014 at the rate of the input clock provided at the input terminal 1002 of the circuit 1000, for example. The gain stage 1016 may be configured to amplify the signal representing the actual slope value 1014 and output a resulting actual DAC value signal 1018 to a DAC 1020 which may be coupled to the output of the gain stage 1016. The DAC 1020 may be configured to convert the actual DAC value signal 1018 into an analog signal which may be used as a slope generator output signal 1022. The slope generator output signal may be a high resolution analog ramp signal. The signal output by the DAC 1020 may be used for at least all the purposes a signal from a slope generator, for example a VCO (voltage controlled oscillator), may be used for.

The circuit according to various embodiments may be able to generate different high-resolution ramp signals by using a pulse swallowing method in combination with a bit inverting method. In addition, the software loop generating the ramp signals does not have to calculate the values of the ramp signal cycle by cycle as they may be generated by a simple decrement/increment operation applied to a digital ramp word. In addition, it may be impossible to obtain the values for the ramp signal cycle by cycle by software for a high-frequency switching DC/DC converter. By using a bit inverting operation with a flexibly programmable pulse swallowing function it is possible to generate rational slope values without the need of a PLL (phase locked loop)/DPLL (digital phase locked loop) or software cycle by cycle interaction. Cycle by cycle software interaction may refer to situations where the software has to interact once during one cycle (of the slope/ ramp signal) or at least once at every step of the slope period. In the latter case, for example, the software may need to update a converted value of the ramp signal in the DAC at every new step within the slope. The circuit according to various embodiments, for example, may be used for controlling several different types of DC/DC control loops, i.e. various different ramp signals may be generated and adjusted according to the mode of operation of a DC/DC converter.

Various signal sequences generated in and/or used by the circuit according to various embodiments, for example the circuit 1000 shown in FIG. 10, are shown in FIG. 11. The generation of a high resolution ramp signal will now be explained based on the signal sequences shown in FIG. 11. The signal sequences are shown without an actual scaling as they merely serve for a qualitative explanation. However, the horizontal dimension for every signal sequence shall represent a time domain and the vertical dimension for every signal sequence shall represent a domain of the magnitude of the corresponding signal.

The prescaled clock signal output by the clock prescaler 1004 is represented by the graph 1102. In this example, the prescaled clock signal 1102 corresponds to a near square wave with the pulses having a trapezoidal shape. However, an actual square wave or any other form of the (prescaled) clock signal may be used, for example a sinusoidal, a triangular or a sawtooth (prescaled) clock signal.

Diagram 1104 represents the counting or labelling process taking place in the bit inverse circuit 1008. Each pulse from the prescaled clock signal is assigned a number which corresponds to its position in the array or row of pulses. As already mentioned, the prescaled clock signal may be subdivided into subsequences of a certain number of pulses. In the given example, one subsequence 1112 of pulses contains 16 pulses. The subsequence 1112 of pulses may be also referred to as pulse swallow window. As can be seen, each block in the diagram 1104 carries a number which is assigned to a pulse from the prescaled clock signal 1102 thereabove. That is, the first pulse in the subsequence 1112 of pulses in the prescaled clock signal 1102 is assigned the number 11, the second pulse in the subsequence 1112 of pulses in the prescaled clock signal 1102 is assigned the number 7, the third pulse in the subsequence 1112 of pulses in the prescaled clock signal 1102 is assigned the number 15 and so on. The numbers displayed in the diagram 1104 correspond to values of digital words already inverted by the bit inverting circuit 1008. In this example, the subsequence 1112 of pulses is preceded by that same sequence of pulses and is followed by that same sequence of pulses as can be verified by comparing the numbers in the blocks of diagram 1104 which reveal the same pattern. In a sense, the (prescaled) clock signal 1102 may be seen as an endless apposition of subsequences 1112 of pulses, wherein the number of pulses in a subsequence 1112, however, be different from the number of pulses in a preceding or following subsequence of pulses (this aspect will be explained in more detail later on). A more thorough explanation of the numbering and inverting process will be now explained with the help of FIG. 13.

Figure 13:
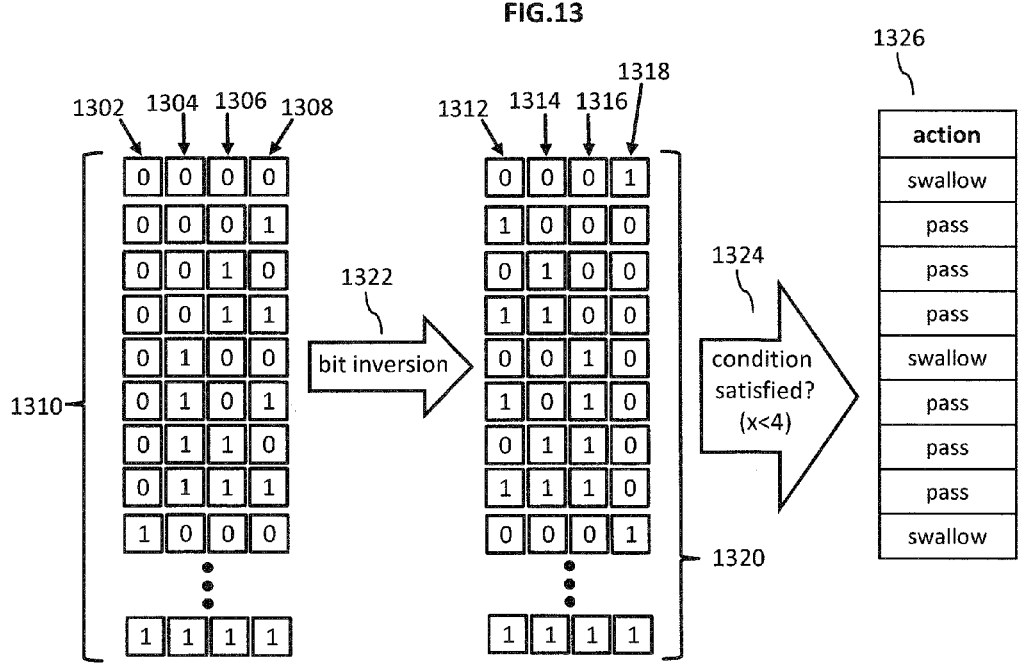
FIG. 13 shows a diagram in which the bit inversion scheme and the pulse swallowing scheme used by the circuit according to various embodiments is explained.

In FIG. 13 the bit inversion scheme which may be used by the circuit according to various embodiments is shown. In this example, a four bit digital word is used to identify pulses within a subsequence 1112 of pulses. However, as mentioned before, the number of bits in the digital word describing the positions of the pulses within a subsequence of pulses may be chosen according to need.

A first array 1310 on the left had side of FIG. 13 represents (from top to bottom) numbers from 0 to 15 in binary form. That is, each row contains four bits, a first bit 1302 being the MSB (most significant bit), a second bit 1304, a third bit 1306 and a fourth bit being the LSB (least significant bit). The digital word in the first row, i.e. "0000", corresponds to 0 in binary form. The digital word in the second row, i.e. "0001", corresponds to 1 in binary form. The digital word in the second row, i.e. "0010", corresponds to 2 in binary form and so on up to the last row in which "1111" corresponds to 15 in binary form. Those 16 digital words may be used to label 16 pulses within a subsequence 1112 of pulses in the (prescaled) clock signal including 16 pulses, for example. A bit inversion process 1322 may be then performed on the digital words to be converted, i.e. on the digital words represented by each of the rows in the first array 1310. The bit inversion process carried out by the bit inverting circuit 1008 swaps the bits within a digital word with one another such that the first bit becomes the last bit and vice versa. In other words, the order of the bits in the inverted digital word is reversed with respect to the order of the bits in the digital word to be inverted. Each row in the second array 1320 in FIG. 13 represents an inverted digital word having a first inverted bit 1312 being the MSB, a second inverted bit 1314, a third inverted bit 1306 and a fourth inverted bit being the LSB. For example, the fourth digital word in the first array 1310 is "0011" which corresponds to 3 in binary form. The corresponding inverted digital word is "1100" which corresponds to 12 in binary form. Therefore, the fourth pulse in the subsequence 1112 of pulses in diagram 1104 in FIG. 11 is assigned the number 12. In the same way, the ninth digital word in the first array 1310 is "1000" which corresponds to 8 in binary form. The corresponding inverted digital word is "0001" which corresponds to 1 in binary form. Therefore, the ninth pulse in the subsequence 1112 of pulses in diagram 1104 in FIG. 11 is assigned the number 1. Inverting all the digital words represented by the rows in the first array 1310 by applying the bit inversion algorithm 1322 just described yields the inverted digital words represented by the rows of the second array 1320. The binary numbers (from top to bottom) from the second array 1320 transformed into decimal form correspond to the numbers (from left to right) labelling the pulses within the subsequence 1112 of pulses in the prescaled clock signal 1102 (the corresponding numbers however are displayed in diagram 1104 representing the counting procedure).

Returning back to FIG. 11, the modified clock signal generated by the pulse swallower 1006 is represented by diagram 1106 corresponding to the slope generation clock 1010 marked in FIG. 10. As can be seen, the slope generation clock signal 1106 is based on the prescaled clock signal 1102 with some pulses missing from the subsequence 1112 of pulses. Every time a pulse swallowing condition is satisfied, a pulse from the prescaled clock signal may not be carried over to the slope generation clock 1106, i.e. it is swallowed. The actual pulse swallowing process will be explained in more detail referring again to FIG. 13.

Starting with the inverted digital words represented by the rows of the second array 1320, it is checked for each pulse whether the pulse swallowing condition is satisfied. In this case the pulse swallowing condition is satisfied, if the value of the inverted digital word is smaller than 4 as an exemplarily chosen number. Therefore, every number displayed in each block in the diagram 1104 of FIG. 11 is checked against the condition value (being equal to 4 in this example) and only if it is equal to 4 or larger than 4 is the corresponding pulse "transferred" or passed to the slope generation clock 1106. In the other case, the pulse is swallowed. As can be seen in the exemplary scenario, for example from the table 1326 in FIG. 13 summarizing the results of the condition check, the first, the fifth, the ninth and the thirteenth pulse from the prescaled clock signal 1102 are swallowed, as the values of the corresponding inverted digital words are smaller than 4. All the other pulses from the subsequence 1112 of pulses are passed to the slope generation clock 1106. As mentioned above, the condition whether a pulse is to be swallowed may be performed in the bit inversion circuit 1008 such that only information indicating which pulses are to be swallowed are provided to the pulse swallower 1006. Alternatively, the inverted digital words may be provided to the pulse swallower 1006 which may be configured to perform the condition check itself.

It is to be mentioned that the condition used as the pulse swallowing condition may of course use other operators, such as "smaller than or equal to", "greater than" or "greater than or equal to" and is not restricted to the exemplarily chosen pulse swallowing condition "smaller than 4" in the scenario illustrated in FIG. 13.

Returning back to FIG. 11, the slope generation clock signal 1106 generated by the pulse swallower 1006 may be passed to the slope value decrement/increment stage 1012. The slope value decrement/increment stage 1012 may then use the slope generation clock signal 1106 to decrement or increment the digital ramp word at every pulse in the slope generation clock 1106 thereby generating the digital ramp signal 1108. A missing pulse in the slope generation clock signal 1106 as compared to the (prescaled) clock signal 1102 directly translates into the digital ramp signal 1108 not being changed, but remaining at its current value and therefore resulting in a small plateau.

At this point it may be realized that by a proper choice of the pulse swallow window size, i.e. the number of pulses contained in a subsequence 1112 of pulses, and the number of pulses to be swallowed, the slope of the digital ramp signal 1108 may be adjusted according to need. The bit inversion algorithm 1322 together with an appropriate choice of the condition value (such that the value of the inverted digital word is smaller than the condition value) may lead to an even distribution of the swallowed pulses throughout the subsequence 1112 of pulses. This in turn may result in a smooth decay or rise of the slope of the digital ramp signal 1108. The start value of the digital ramp word it is reset to at every beginning of a new cycle, i.e. the value at which the digital ramp starts, the number of pulses to be swallowed in one pulse swallow window and the pulse swallow window size may be updated via software glitch free for every switching cycle of a DC/DC converter, i.e. for every processing of a certain batch of subsequences 1112 of pulses which are processed during one cycle. This allows for on the fly optimization adjustments of the running DC/DC converter and/or on the fly compensation of fluctuations in the operation of the DC/DC converter. It is to be stressed that the pulse swallow condition used in the exemplary condition check of FIG. 13 is merely an exemplary one and may be adjusted according to need, i.e. the number with which the value of the inverted digital words is compared may assume other suitable values.

Returning back to FIG. 11, the digital ramp signal 1108 corresponding to the actual slope value 1014 in FIG. 10 is passed to the DAC 1120, possibly through the gain stage 1016. Finally, the DAC 1020 outputs an analog ramp signal 1022, wherein the analog ramp signal 1022 may correspond to the averaged digital ramp signal 1108.

At the bottom of FIG. 11, three exemplary analog ramp signals 1110 are shown, a first analog ramp signal A, a second analog ramp signal B and a third analog ramp signal C. The first analog ramp signal A may be generated by the circuit according to various embodiments with the pulse swallower disabled and with a clock prescaler factor of 1, i.e. the clock prescaler 1004 has no effect on the clock signal provided at the input terminal 1002 of the circuit 1000. The first analog ramp signal A may for example be generated by a slope generation clock 1010 with a frequency of 50 MHz and with a decrement of 1 (with the pulse swallower 1006 being inactive). The third analog ramp signal C may be produced by the circuit according to various embodiments with the pulse swallower disabled and with a clock prescaler factor of 2, i.e. the clock prescaler 1004 may be configured to provide a prescaled clock signal which has double the frequency of the clock signal provided at the input terminal 1002 of the circuit 1000 according to various embodiments. The third analog ramp signal C may for example be generated by a slope generation clock 1010 with a frequency of 100 MHz and with a decrement of 1 at every pulse (with the pulse swallower 1006 being inactive) or with a frequency of 50 MHz and with a decrement of 2 at every pulse (with the pulse swallower 1006 being inactive).

With the pulse swallowing scheme according to various embodiments, as described above, it is possible to generate high resolution ramp signals between the first analog ramp signal A and the third analog ramp signal C shown in FIG. 11. The second analog ramp signal B shown in FIG. 11 may represent a ramp signal generated using the pulse swallowing scheme according to various embodiments. The slope of the second analog ramp signal B shown in FIG. 11 may be continuously transitioned starting at the slope of the third analog ramp signal C and arriving at the first analog ramp signal A by increasing the number of pulses to be swallowed and fine tuning the slope by adjusting the pulse swallow window. The combination of the bit inversion scheme and the pulse swallowing scheme may allow to generate high resolution ramp signals with arbitrary slopes without the need to change the clock signal. The thus generated ramp signal may start at an arbitrary value and may end at an arbitrary value without the need to adjust the clock signal, as the initial value of the digital ramp word, the decrement/increment factor and/or the number of swallowed pulses may be adjusted.

Figure 14:
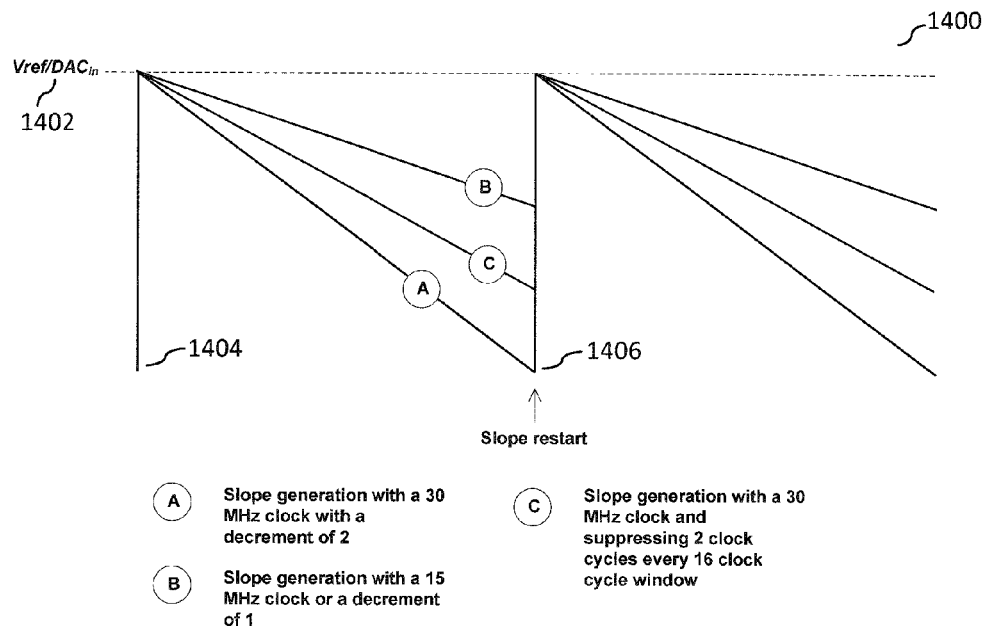
FIG. 14 shows exemplary ramp signals generated by the circuit according to various embodiments.

In diagram 1400 in FIG. 14 further exemplary ramp signals which may be generated by the circuit according to various embodiments are shown. The analog ramp signals are shown without an actual scaling as they merely serve for a qualitative explanation. However, the horizontal dimension for every signal sequence shall represent a time domain and the vertical dimension for every signal sequence shall represent a domain of the magnitude of the corresponding signal.

At a first point in time 1404 the ramp signal may be reinitiated or reset. That is, after a certain amount of subsequences 1112 of pulses (see FIG. 11) have been processed, the ramp signal "ends" and is reset to its starting value such that a new ramp signal may be generated. In the exemplary scenario shown in FIG. 14, each ramp signal is reset to a starting value 1402 $V_{ref}/DAC_{in}$ which corresponds to a reference value $V_{ref}$ normalized by the actual DAC value $DAC_{in}$ output by the gain stage 1016 in FIG. 10. The normalization by $DAC_{in}$ is just a formal aspect and merely serves for a simplified display of the three analog ramp signals such that they all start off from the same value. A first graph A may, for example, represent a first analog ramp signal with a slope based on a clock signal of 30 MHz and a decrement of 2. That is, at every occurrence of a pulse in the clock signal, so roughly every 33.3 nanoseconds, the digital ramp word is decremented by 2. A second graph B may, for example, represent a second analog ramp signal with a slope based on a clock signal of 15 MHz and a decrement of 1. The first ramp signal A and the second ramp signal B may be signals which may be generated without employing the pulse swallowing scheme. A third graph C may, for example, represent an analog ramp signal with a slope based on a clock signal of 30 MHz and a decrement of 2, wherein the pulse swallowing scheme is used such that 2 pulses may be swallowed in each subsequence 1112 of pulses, each having a length of 16 pulses. As can be seen, the thus generated third ramp signal C uses the same clock signal and the same decrement as the second ramp signal B. However, due to the use of the pulse swallowing scheme according to various embodiments the slope of the second ramp signal B corresponds to an intermediate slope lying between the slope of the second ramp signal B and the first ramp signal A. At a second point in time 1406 the ramp signals are reinitiated and a new cycle begins, in which the ramp signals may be generated "from the start". The second point in time 1406 may be defined by the ramp signals having decreased to a corresponding predetermined value or by the time passed between the start of the ramp signals at the first point in time 1404 and the end of the ramp signals at the second point in time 1406.

The values given in the description of the analog ramp signals A, B, C shown in FIG. 14 are exemplary values which shall by no means be perceived in a limiting way. The frequency of the clock signal, the number of pulses in one subsequence 1112 of pulses defining the pulse swallow window and the value of the decrement/increment may be all freely chosen and updated in between the cycles in which a ramp signal is generated. Further, the ramp signals A, B, C shown in FIG. 14 feature declining slopes. However, the exact same circuit according to various embodiments and the exact same pulse swallowing scheme together with the bit inverting scheme may be used to produce ramp signals with increasing slopes. A ramp signal with an increasing slope may be generated by increasing the digital ramp word (serving as the basis for the generation of the analog ramp signal) by an increment value at every pulse present in the slope generation clock 1106 (see FIG. 11).

Figure 15:
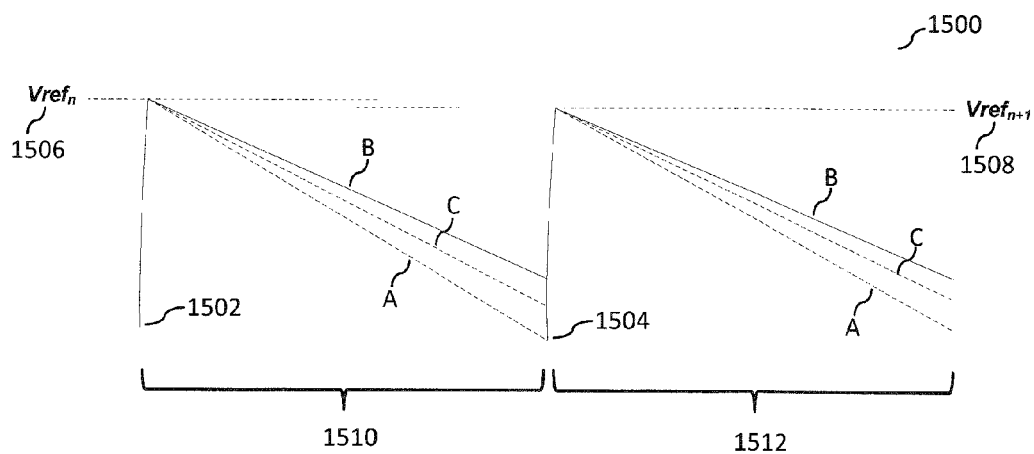
FIG. 15 shows further exemplary ramp signals generated by the circuit according to various embodiments.

In diagram 1500 in FIG. 15 further exemplary ramp signals which may be generated by the circuit according to various embodiments are shown in analogy to diagram 1400 shown in FIG. 14. The diagram 1500 shows a first analog ramp signal A, a second analog ramp signal B and a third analog ramp signal C which may correspond to the first analog ramp signal A, a second analog ramp signal B and a third analog ramp signal C shown in diagram 1400 in FIG. 14. All three ramp signals A, B, C in a first cycle 1510 start at a first point in time 1502 and end at a second point in time 1506 which simultaneously marks the start point for the ramp signals generated in the following second cycle 1512. The three ramp signals A, B, C in a first cycle 1510 start at a reference value $Vref_n$. As already mentioned, the start value for a ramp signal may be adjusted or updated such that the start value for the ramp signal in one cycle may differ from the start value for the ramp signal in the following cycle. This is shown in FIG. 15, where the start value $Vref_{n+1}$ in the second cycle 1512 has been decreased with respect to the start value $Vref_n$ in the first cycle 1510 preceding the second cycle 1512.

Figure 12:
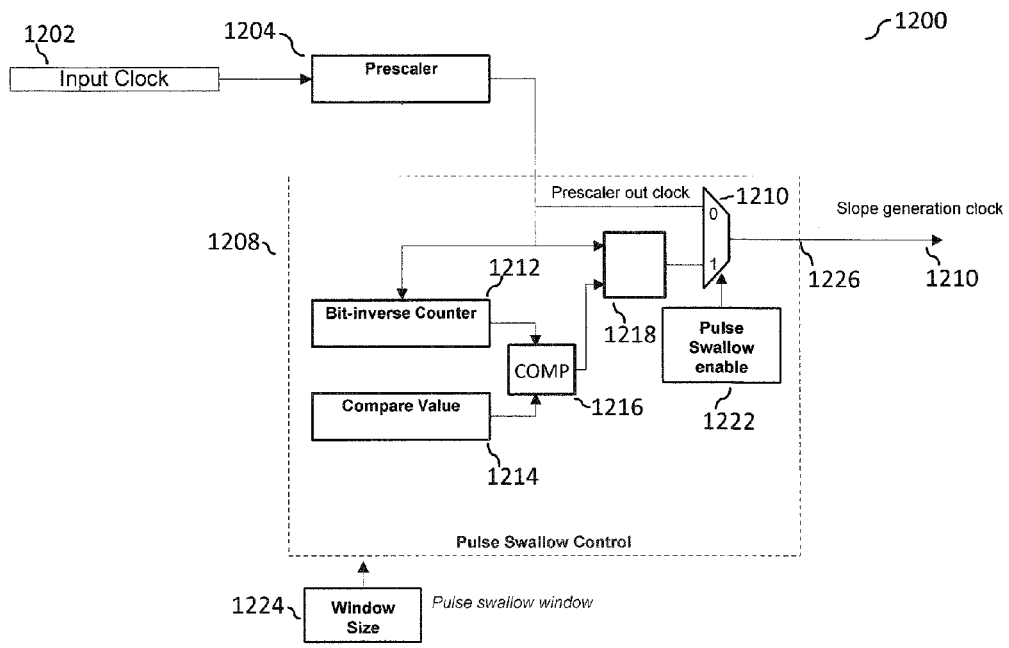
FIG. 12 shows an implementation of the circuit according to various embodiments for providing a high resolution slope.

In FIG. 12 an implementation of the circuit 1200 according to various embodiments is shown. A clock signal 1202, for example from a clock generator, may be provided to a prescaler 1204. The prescaler 1204 may be coupled to a pulse swallow control circuit 1208, for example to a first input of a pulse swallower 1210, to a bit inverse counter 1212 and to a first input of a clock suppressing circuit 1218. An output of the bit inverse counter 1212 may be coupled to a first input of a comparator 1216, the other input thereof may be coupled to a compare value register 1214. An output of the compare value register 1214 may be coupled to a second input of the comparator 1216. An output of the comparator 1216 may be coupled to a second input of the clock suppressing circuit 1218. An output of the clock suppressing circuit 1218 may be coupled to a second input of the pulse swallower 1210. The pulse swallower 1210 may include an output 1226 at which the slope generation clock 1010 (see also FIG. 10) may be provided.

The prescaler may be configured to prescale the clock signal 1202. For example, the prescaler 1204 may multiply the clock signal 1202 by two or divide it by two, depending on the frequency of the clock signal required by the pulse swallow control circuit 1208. In the embodiment of the circuit 1200 the pulse swallow control circuit 1208 receiving the prescaled clock signal may be configured to provide the functions of the bit inverting circuit 904 and the pulse swallowing circuit 906 provided in the circuit 900 according to various embodiments shown in FIG. 9. The bit inverse counter 1212 may count the pulses within each subsequence 1112 of pulses and allocated the corresponding number to each pulse according to its order in the sequence 1112 of pulses. In addition, every digital word describing the position of the pulse in the subsequence 1112 of pulses may be inverted. The comparator 1216 is configured to compare the value of the inverted digital word with a compare value stored in the compare value register 1214. In the bit inversion scheme and the pulse swallowing scheme presented in FIG. 13, the compare value was chosen to be 4, such that in that example the pulse swallow condition was satisfied, if the value of the inverted digital word was smaller than 4. The compare value register may be also configured to receive further parameters which may define how many pulses are to be swallowed in a subsequence 1112 of pulses and/or from which the compare value may be calculated and used for checking of the pulse swallow condition. The output of the comparator 1216 is coupled to the second input of the clock suppressing circuit 1218 and the prescaled clock signal is coupled to the first input thereof. Therefore, the output of the clock suppressing circuit 1218 indicates when a pulse in the prescaled clock signal appears which needs to be swallowed. The clock suppressing circuit 1218 may be, for example, configured as an AND gate in order to combine those two conditions, i.e. the condition of a pulse within the clock signal being currently present on the signal line and the decision that the current pulse needs to be swallowed. Finally, the pulse swallower 1210 may be configured to swallow a pulse from the prescaled clock signal output by the prescaler 1204 in accordance with the signal provided by the clock suppressing circuit 1218. The pulse swallower 1210 may be further configured to receive a third parameter 1222 which may determine if the pulse swallowing scheme is to be used or not, i.e. if the pulse swallower 1210 is remain active or not. In other words, the third parameter 1222 may be seen as a switch for switching on the pulse swallowing functionality or disabling it. The pulse swallow control circuit 1208 may be configured to receive a fourth parameter 1224 which may define the pulse swallow window size corresponding to the number of pulses contained in one subsequence 1112 of pulses.

Figure 16:
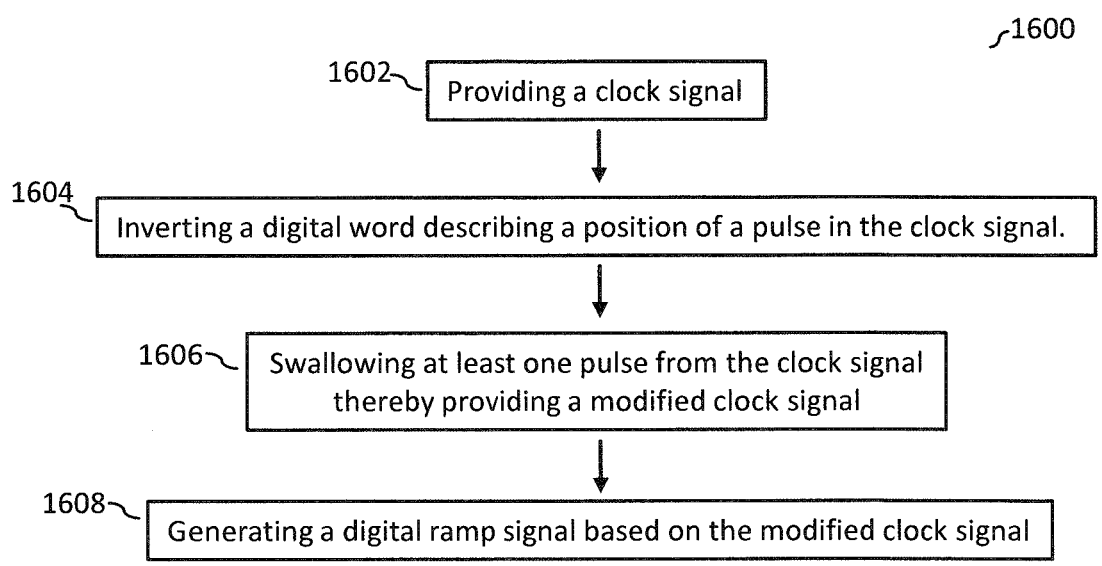
FIG. 16 shows a diagram explaining a method to provide a high resolution ramp signal according to various embodiments.

In FIG. 16 a diagram 900 is shown explaining the method for providing a high resolution ramp signal according to various embodiments. In a first step 902 a clock signal may be provided, wherein the clock signal may include a sequence of pulses. In a second step 904, a digital word may be inverted, each digital word corresponding to a number describing a position of each pulse within the sequence of pulses. In a third step 906 at least one pulse from the sequence of pulses in the clock signal may be swallowed when a pulse swallowing condition for that pulse is satisfied. Thereby, a modified clock signal (which may be the slope generation clock 1010 in FIG. 10) may be generated. In a fourth step 908 a digital ramp signal (which may be the digital ramp signal 1108 in FIG. 11) based on the modified clock signal may be generated.

In various embodiments a controller for controlling the operation of a switched mode power supply is provided, the controller comprising: a first signal source configured to provide a first set of signals including a set signal and a clear signal, wherein the first set of signals may correspond to a first mode of operation of the switched mode power supply; a second signal source configured to provide a second set of signals including a set signal and a clear signal, wherein the second set of signals may correspond to a second mode of operation of the switched mode power supply; a selecting circuit coupled to the first signal source and to the second signal source, the selecting circuit being configured to select either the first set of signals or the second set of signals; a switching signal generating circuit coupled to the selecting circuit and configured to provide a switching signal to the switched mode power supply based on the set of signals received from the selecting circuit.

According to various further embodiments of the controller the first mode of operation of the switched mode power supply may correspond to a normal load operation mode.

According to various further embodiments of the controller the second mode of operation of the switched mode power supply may correspond to a low load operation mode.

According to various further embodiments of the controller the selecting circuit may be configured to select either the first set of signals or the second set of signals depending on the desired operation mode of the switched mode power supply.

According to various further embodiments the controller may further include at least one further signal source configured to provide a further set of signals comprising a set signal and a clear signal, wherein the further set of signals may correspond to a further mode of operation of the switched mode power supply.

According to various further embodiments of the controller the selecting circuit may be further coupled to the at least one further signal source, the selecting circuit being then configured to select either the first set of signals, the second set of signals or the at least one further set of signals.

According to various further embodiments the controller may further include a high resolution signal forwarding circuit, wherein the selecting circuit may be coupled to the switching signal generating circuit via the high resolution signal forwarding circuit.

According to various further embodiments of the controller the high resolution signal forwarding circuit may be configured to generate a high resolution set signal and a high resolution clear signal on the basis of the selected set signal and the selected clear signal.

According to various further embodiments of the controller the high resolution signal forwarding circuit may be configured to generate a high resolution set signal and a high resolution clear signal on the basis of the selected set signal and the selected clear signal.

According to various further embodiments of the controller the high resolution signal forwarding circuit may be configured to provide the high resolution set signal and the high resolution clear signal to the switching signal generating circuit.

According to various further embodiments of the controller the first set of signals may further include a first update signal indicating when to update the switching signal when the switched mode power supply operates in the first mode of operation; and the second set of signals may further include a second update signal indicating when to update the switching signal when the switched mode power supply operates in the second mode of operation.

According to various further embodiments of the controller the selecting circuit may be further configured to select either the first update signal or the second update signal depending on whether the set signal and the clear signal from the first set of signals or the second set of signals is selected and provide the selected update signal to the high resolution signal forwarding circuit.

According to various further embodiments of the controller the high resolution signal forwarding circuit may be further configured to update at least one of the high resolution set signal and the high resolution clear signal in accordance with the update signal corresponding to the selected set of signals.

According to various further embodiments of the controller the high resolution signal forwarding circuit may be further configured to update at least one of the high resolution set signal and the high resolution clear signal for a respective switching cycle during a preceding switching cycle of the switched mode power supply.

According to various further embodiments the controller may be configured such that the selected set of signals may be generated by the corresponding signal source before the updating of at least one of the high resolution set signal and the high resolution clear signal.

According to various further embodiments the controller may be configured to update at least one of the high resolution set signal and the high resolution clear signal by adjusting it in time.

According to various further the controller may be further configured such that the adjusting of at least one of the high resolution set signal and the high resolution clear signal may include shifting in time at least one of its rising edge and falling edge.

According to various further embodiments of the controller the switching signal may include a pulse width modulated signal.

According to various further embodiments the controller may further include a dead time adder circuit coupled between the high resolution signal forwarding circuit and the switching signal generating circuit, the dead time adder circuit being configured to shift in time the high resolution set signal and/or the high resolution set signal.

In accordance with various embodiments, a switched mode power supply is provided, the switched mode power supply including: a converter circuit including a supply input and an output terminal, the converter circuit configured to receive an input voltage at the supply input and to provide an output voltage at the output terminal, the converter circuit further including a switch coupled between the supply input and the output terminal; and a controller for controlling the operation of the converter circuit, the controller including: a first signal source configured to provide a first set of signals comprising a set signal and a clear signal, wherein the first set of signals corresponds to a first mode of operation of the converter circuit; a second signal source configured to provide a second set of signals comprising a set signal and a clear signal, wherein the second set of signals corresponds to a second mode of operation of the converter circuit; a selecting circuit coupled to the first signal source and to the second signal source, the selecting circuit being configured to select either the first set of signals or the second set of signals; and a switching signal generating circuit coupled to the selecting circuit and configured to provide a switching signal to a control terminal of the switch provided in the converter circuit based on the set of signals received from the selecting circuit.

According to various further embodiments of the switched mode power supply the selecting circuit may be configured to select either the first set of signals or the second set of signals depending on the desired operation mode of the switched mode power supply.

According to various further embodiments the switched mode power supply may further include a high resolution signal forwarding circuit, wherein the selecting circuit may be coupled to the switching signal generating circuit via the high resolution signal forwarding circuit.

According to various further embodiments of the switched mode power supply the high resolution signal forwarding circuit may be configured to generate a high resolution set signal and a high resolution clear signal on the basis of the selected set signal and clear signal.

According to various further embodiments of the switched mode power supply the first set of signals may further include a first update signal indicating when to update the switching signal when the switched mode power supply operates in the first mode of operation and the second set of signals may further include a second update signal indicating when to update the switching signal when the switched mode power supply operates in the second mode of operation.

In accordance with various further embodiments a method for controlling a switched mode power supply is provided, wherein the method may include: providing a first set of signals comprising a set signal and a clear signal, wherein the first set of signals may correspond to a first mode of operation of the switched mode power supply; providing a second set of signals comprising a set signal and a clear signal, wherein the second set of signals may correspond to a second mode of operation of the switched mode power supply; selecting either the first set of signals or the second set of signals; providing a switching signal based on the selected set of signals to at least one switch provided in the switched mode power supply.

In accordance with various embodiments a circuit is provided which may include an input terminal configured to receive a clock signal, wherein the clock signal may include a sequence of pulses; a bit inverting circuit configured to invert a digital word, each digital word corresponding to a number describing a position of each pulse within the sequence of pulses; a pulse swallowing circuit configured to receive the clock signal and swallow at least one pulse from the sequence of pulses in the clock signal when a pulse swallowing condition for that pulse is satisfied and to thereby generate a modified clock signal; a digital ramp generation circuit configured to provide a digital ramp signal based on the modified clock signal.

According to further embodiments of the circuit the order of bits in the inverted digital word may be reversed with respect to the digital word to be inverted.

According to further embodiments of the circuit the bit inverting circuit may be further configured to subdivide the sequence of pulses into subsequences of pulses containing a predefined number of pulses.

According to further embodiments of the circuit the position of each pulse within the sequence of pulses may correspond to the position of that pulse within the subsequence of pulses.

According to further embodiments, the circuit may be configured to receive a first parameter, the first parameter defining the predefined number of pulses contained in the subsequence of pulses.

According to further embodiments the circuit may be configured to receive a second parameter, the second parameter defining a number of pulses to be swallowed in the subsequence of pulses by the pulse swallowing circuit.

According to further embodiments of the circuit the pulse swallowing circuit may be further configured to evenly distribute the swallowed pulses within one subsequence of pulses over that subsequence of pulses.

According to further embodiments of the circuit the pulse swallowing condition may be satisfied when the number represented by the inverted digital word is smaller than the second parameter.

According to further embodiments of the circuit the bit length of each digital word corresponding to the number describing the position of each pulse within the subsequence of pulses may be determined by the first parameter.

According to further embodiments of the circuit the digital ramp generation circuit may be further configured to provide the digital ramp signal by incrementing or decrementing a digital ramp word at every occurrence of a pulse in the modified clock signal.

According to further embodiments of the circuit the circuit may be further configured to receive a third parameter, the third parameter defining a value of the increment or decrement by which the digital ramp word is incremented or decremented at every occurrence of a pulse in the modified clock signal.

According to further embodiments of the circuit the circuit may be further configured to receive a fourth parameter, the fourth parameter defining a digital value to which the digital ramp word is reset to at the end of a digital ramp generation cycle.

According to further embodiments the circuit may further include a clock signal prescaling circuit coupled between the input terminal and the bit inverting circuit and configured to prescale the clock signal by a predetermined factor.

According to further embodiments of the circuit the circuit may be further configured to receive a fifth parameter, the fifth parameter defining the predetermined factor.

According to further embodiments the circuit may further include a digital-to-analog converter coupled to the digital ramp generation circuit and configured to provide an analog ramp signal based on the a digital ramp signal.

In accordance with various embodiments a circuit is provided which may include a clock input configured to receive a clock signal, wherein the clock signal comprises a sequence of pulses; a bit inverter configured to reverse an order of bits in a digital word, each digital word corresponding to a number describing a position of each pulse within the sequence of pulses; a pulse swallower configured to receive the clock signal and drop at least one pulse from the sequence of pulses in the clock signal when a dropping condition for that pulse is satisfied and to thereby generate a modified clock signal; and a digital ramp generator configured to generate a digital ramp signal based on the modified clock signal.

In accordance with various embodiments a method to provide a digital ramp signal is provided, the method including: providing a clock signal including a sequence of pulses; inverting a digital word, each digital word corresponding to a number describing a position of each pulse within the sequence of pulses; swallowing at least one pulse from the sequence of pulses in the clock signal when a pulse swallowing condition for that pulse is satisfied and thereby generating a modified clock signal; and generating a digital ramp signal based on the modified clock signal.

According to further embodiments of the method inverting the digital word may include reversing the order of the bits in the digital word.

According to further embodiments the method may further include subdividing the sequence of pulses into subsequences of a predefined number of pulses.

According to further embodiments of the method the position of each pulse within the sequence of pulses may correspond to the position of that pulse within the subsequence of pulses.

According to further embodiments of the method swallowing at least one pulse from the sequence of pulses in the clock signal may include distributing the at least one swallowed pulse in the subsequence of pulses evenly over that subsequence of pulses.

According to further embodiments of the method the pulse swallowing condition for a pulse may be satisfied when the number represented by the corresponding inverted digital word is smaller than a predetermined number.

According to further embodiments of the method the bit length of each digital word corresponding to the number describing the position of each pulse within the subsequence of pulses may be determined by the predefined number of pulses.

According to further embodiments of the method providing the digital ramp signal may further include incrementing or decrementing a digital ramp word at every occurrence of a pulse in the modified clock signal.

According to further embodiments the method may further include resetting the digital ramp word to a configurable (e.g. a predetermined) digital value at the end of a digital ramp generation cycle.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A controller for controlling the operation of a switched mode power supply, the controller comprising:
    a first signal source configured to provide a first set of signals comprising a set signal and a clear signal, wherein the first set of signals corresponds to a first mode of operation of the switched mode power supply;
    a second signal source configured to provide a second set of signals comprising a set signal and a clear signal, wherein the second set of signals corresponds to a second mode of operation of the switched mode power supply;
    a selecting circuit coupled to the first signal source and to the second signal source, the selecting circuit being configured to select a set of signals from either the first set of signals or the second set of signals;
    a switching signal generating circuit coupled to the selecting circuit and configured to provide a switching signal to the switched mode power supply based on the set of signals selected by the selecting circuit; and
    a high resolution signal forwarding circuit, wherein the selecting circuit is coupled to the switching signal generating circuit via the high resolution signal forwarding circuit;
    wherein the high resolution signal forwarding circuit is configured to generate a high resolution set signal and a high resolution clear signal on the basis of a selected set signal and a selected clear signal of the set of signals selected by the selectin circuit.

2. The controller of claim 1,
    wherein the selecting circuit is configured to select the set of signals from either the first set of signals or the second set of signals depending on the desired operation mode of the switched mode power supply.

3. The controller of claim 1 further comprising:
    at least one further signal source configured to provide at least one further set of signals comprising a set signal and a clear signal, wherein the further set of signals corresponds to a further mode of operation of the switched mode power supply.

4. The controller of claim 1,
    wherein the high resolution signal forwarding circuit is configured to refresh the high resolution set signal and the high resolution clear signal for every switching cycle of the switched mode power supply.

5. The controller of claim 1,
    wherein the first set of signals further comprises a first update signal indicating when to update the switching signal when the switched mode power supply operates in the first mode of operation; and
    wherein the second set of signals further comprises a second update signal indicating when to update the switching signal when the switched mode power supply operates in the second mode of operation.

6. The controller of claim 1,
    wherein the high resolution signal forwarding circuit is configured to receive the set of signals selected by the selecting circuit and output the high resolution set signal and the high resolution clear signal; and
    wherein the switching signal generating circuit is configured to provide the switching signal based on the high resolution set signal and the high resolution clear signal output from the high resolution signal forwarding circuit.

7. The controller of claim 3,
    wherein the selecting circuit is further coupled to the at least one further signal source, the selecting circuit being then configured to select the set of signals from either the first set of signals, the second set of signals or the at least one further set of signals.

8. The controller of claim 5,
    wherein the selecting circuit is further configured to select either the first update signal or the second update signal depending on whether the set signal and the clear signal from the first set of signals or the second set of signals is selected and provide a selected update signal to the high resolution signal forwarding circuit.

9. The controller of claim 5,
    wherein the high resolution signal forwarding circuit is further configured to update at least one of the high resolution set signal and the high resolution clear signal in accordance with the update signal corresponding to the set of signals selected by the selecting circuit.

10. The controller of claim 5,
    wherein the high resolution signal forwarding circuit is further configured to update at least one of the high resolution set signal and the high resolution clear signal for a respective switching cycle during a preceding switching cycle of the switched mode power supply.

11. The controller of claim 9,
    wherein the controller is configured such that the set of signals selected by the selecting circuit is generated by the corresponding signal source before the updating of at least one of the high resolution set signal and the high resolution clear signal.

12. The controller of claim 10,
    wherein the circuit is configured to update at least one of the high resolution set signal and the high resolution clear signal by adjusting it in time.

13. The controller of claim 12,
    wherein the controller is configured such that the adjusting of the at least one of the high resolution set signal and the high resolution clear signal includes shifting in time at least one of its rising edge and falling edge.

14. A switched mode power supply comprising:
    a converter circuit comprising a supply input and an output terminal, the converter circuit configured to receive an input voltage at the supply input and to provide an output voltage at the output terminal, the converter circuit further comprising a switch coupled between the supply input and the output terminal; and
    a controller for controlling the operation of the converter circuit, the controller comprising:
    a first signal source configured to provide a first set of signals comprising a set signal and a clear signal, wherein the first set of signals corresponds to a first mode of operation of the converter circuit;
    a second signal source configured to provide a second set of signals comprising a set signal and a clear signal, wherein the second set of signals corresponds to a second mode of operation of the converter circuit;

a selecting circuit coupled to the first signal source and to the second signal source, the selecting circuit being configured to select a set of signals from either the first set of signals or the second set of signals;

a switching signal generating circuit coupled to the selecting circuit and configured to provide a switching signal to a control terminal of the switch provided in the converter circuit based on the set of signals selected by the selecting circuit; and a high resolution signal forwarding circuit, wherein the selecting circuit is coupled to the switching signal generating circuit via the high resolution signal forwarding circuit;

wherein the high resolution signal forwarding circuit is configured to generate a high resolution set signal and a high resolution clear signal on the basis of a selected set signal and a selected clear signal of the set of signals selected by the selecting circuit.

15. The switched mode power supply of claim 14,
wherein the high resolution signal forwarding circuit is configured to receive the set of signals selected by the selecting circuit and output the high resolution set signal and the high resolution clear signal; and
wherein the switching signal generating circuit is configured to provide the switching signal based on the high resolution set signal and the high resolution clear signal output from the high resolution signal forwarding circuit.

16. A method for controlling a switched mode power supply, the method comprising:
providing a first set of signals comprising a set signal and a clear signal, wherein the first set of signals corresponds to a first mode of operation of the switched mode power supply;
providing a second set of signals comprising a set signal and a clear signal, wherein the second set of signals corresponds to a second mode of operation of the switched mode power supply;
selecting a set of signals from either the first set of signals or the second set of signals;
providing a switching signal based on the set of signals selected by the selecting circuit to at least one switch provided in the switched mode power supply; and
providing a high resolution signal forwarding circuit, wherein the switching signal generating circuit is coupled to the high resolution signal forwarding circuit;
wherein the high resolution signal forwarding circuit is configured to generate a high resolution set signal and a high resolution clear signal on the basis of the set of signals selected by the selecting circuit.

17. A circuit comprising:
an input terminal configured to receive a clock signal, wherein the clock signal comprises a sequence of pulses;
a bit inverting circuit configured to invert a digital word, each digital word corresponding to a number describing a position of each pulse within the sequence of pulses;
a pulse swallowing circuit configured to receive the clock signal and swallow at least one pulse from the sequence of pulses in the clock signal when a pulse swallowing condition for that pulse is satisfied and to thereby generate a modified clock signal;
a digital ramp generation circuit configured to provide a digital ramp signal based on the modified clock signal.

18. The circuit of claim 17,
wherein the order of bits in the inverted digital word is reversed with respect to the digital word to be inverted.

19. The circuit of claim 17,
wherein the bit inverting circuit is further configured to subdivide the sequence of pulses into subsequences of pulses containing a predefined number of pulses.

20. The circuit of claim 17,
wherein the digital ramp generation circuit is further configured to provide the digital ramp signal by incrementing or decrementing a digital ramp word at every occurrence of a pulse in the modified clock signal.

21. The circuit of claim 19,
wherein the circuit is configured to receive a first parameter, the first parameter defining the predefined number of pulses contained in the subsequence of pulses.

22. The circuit of claim 19,
wherein the circuit is further configured to receive a second parameter, the second parameter defining a number of pulses to be swallowed in the subsequence of pulses by the pulse swallowing circuit.

23. The circuit of claim 19,
wherein the pulse swallowing circuit is further configured to evenly distribute the swallowed pulses within one subsequence of pulses over that subsequence of pulses.

24. The circuit of claim 22,
wherein pulse swallowing condition is satisfied when the number represented by the inverted digital word is smaller than the second parameter.

25. A method to provide a digital ramp signal, the method comprising:
providing a clock signal comprising a sequence of pulses;
inverting a digital word, each digital word corresponding to a number describing a position of each pulse within the sequence of pulses;
swallowing at least one pulse from the sequence of pulses in the clock signal when a pulse swallowing condition for that pulse is satisfied and thereby generating a modified clock signal;
generating a digital ramp signal based on the modified clock signal.

26. The method of claim 25, wherein the method further comprises:
subdividing the sequence of pulses into subsequences of a predefined number of pulses.

27. The method of claim 25,
wherein inverting the digital word comprises reversing the order of the bits in the digital word.

28. The method of claim 26,
wherein the position of each pulse within the sequence of pulses corresponds to the position of that pulse within the subsequence of pulses.

29. The method of claim 26,
wherein swallowing at least one pulse from the sequence of pulses in the clock signal comprises distributing the at least one swallowed pulse in the subsequence of pulses evenly over that subsequence of pulses.

30. The method of claim 25,
wherein the pulse swallowing condition for a pulse is satisfied when the number represented by the corresponding inverted digital word is smaller than a predetermined number.

* * * * *

UNITED STATES PATENT AND TRADEMARK OFFICE
CERTIFICATE OF CORRECTION

PATENT NO. : 9,041,375 B2  
APPLICATION NO. : 13/663559  
DATED : May 26, 2015  
INVENTOR(S) : Pedro Costa Page 1 of 1

It is certified that error appears in the above-identified patent and that said Letters Patent is hereby corrected as shown below:

Claim 1 - Column 33, line 42: delete "selectin circuit" and write --selecting circuit-- in place thereof.

Signed and Sealed this
Fifteenth Day of March, 2016

Michelle K. Lee
*Director of the United States Patent and Trademark Office*